United States Patent
Lee

(10) Patent No.: US 12,079,506 B2
(45) Date of Patent: Sep. 3, 2024

(54) MEMORY EXPANDER, HOST DEVICE USING MEMORY EXPANDER, AND OPERATION METHOD OF SEVER SYSTEM INCLUDING MEMORY EXPANDER

(71) Applicant: SAMSUNG ELECTRONICS CO., LTD., Suwon-si (KR)

(72) Inventor: Chon Yong Lee, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 341 days.

(21) Appl. No.: 17/509,650

(22) Filed: Oct. 25, 2021

(65) Prior Publication Data
US 2022/0137864 A1  May 5, 2022

(30) Foreign Application Priority Data
Oct. 29, 2020 (KR) .................. 10-2020-0141708

(51) Int. Cl.
*G06F 3/06* (2006.01)
*G06F 13/16* (2006.01)

(52) U.S. Cl.
CPC .......... *G06F 3/0655* (2013.01); *G06F 3/0604* (2013.01); *G06F 3/0679* (2013.01); *G06F 13/1631* (2013.01); *G06F 13/1663* (2013.01)

(58) Field of Classification Search
CPC .... G06F 3/0655; G06F 3/0604; G06F 3/0679; G06F 13/1631; G06F 13/1663; G06F 13/4221; G06F 13/4208; G06F 13/40; G06F 13/16; G06F 13/14; G06F 13/1652; G06F 13/1657
See application file for complete search history.

(56) References Cited

U.S. PATENT DOCUMENTS

| | | | |
|---|---|---|---|
| 8,533,724 B1 | 9/2013 | Theimer et al. | |
| 9,838,277 B2 | 12/2017 | Raney | |
| 10,127,071 B2 | 11/2018 | Paolino et al. | |
| 10,178,054 B2 | 1/2019 | Palermo et al. | |
| 11,789,878 B2* | 10/2023 | Graniello | G06F 3/061 |
| | | | 711/154 |
| 2017/0364394 A1 | 12/2017 | Fujita | |
| 2019/0361818 A1 | 11/2019 | Ichikawa | |
| 2020/0125503 A1 | 4/2020 | Graniello et al. | |
| 2020/0192798 A1 | 6/2020 | Natu | |
| 2022/0066928 A1* | 3/2022 | Tavallaei | G06F 12/123 |
| 2022/0150055 A1* | 5/2022 | Cui | H04L 63/0236 |

FOREIGN PATENT DOCUMENTS

JP    2015170887 A    9/2015

OTHER PUBLICATIONS

Partial European Search Report in European Appl. No. 21203887.1, mailed on Apr. 4, 2022, 14 pages.

* cited by examiner

*Primary Examiner* — Idriss N Alrobaye
*Assistant Examiner* — Richard B Franklin
(74) *Attorney, Agent, or Firm* — Fish & Richardson P.C.

(57) ABSTRACT

A memory expander includes a memory device having a first memory region corresponding to a first host and a second memory region corresponding to a second host. A controller communicates with the first host and the second host through a compute express link (CXL) interface. The controller receives a first CXL communication packet from the first host and performs a target data transfer operation of transferring target data stored in the first memory region to the second memory region, in response to the first CXL communication packet.

20 Claims, 27 Drawing Sheets

[Related Art]

FIG. 7

| Valid | MEM Opcode | MetaField | MetaValue | SNP Type | Address | Tag | TC | RSVD |

CXL_header

MEMORY EXPANDER, HOST DEVICE USING MEMORY EXPANDER, AND OPERATION METHOD OF SEVER SYSTEM INCLUDING MEMORY EXPANDER

CROSS-REFERENCE TO RELATED APPLICATIONS

This application claims priority under 35 U.S.C. § 119 to Korean Patent Application No. 10-2020-0141708 filed on Oct. 29, 2020, in the Korean Intellectual Property Office, the disclosure of which is incorporated by reference herein in its entirety.

BACKGROUND

Embodiments of the present disclosure described herein relate to a computing system, and more particularly, relate to a memory expander, a host device using the memory expander, and an operation method of a server system including the memory expander and the host device.

A computing system may provide various information technology (IT) services to a user. As various IT services are provided to the user, the amount of data that are processed by the computing system increases. For this reason, there is a need to improve a speed at which data are processed. The computing system is developing into a heterogeneous computing environment to provide various IT services. Nowadays, various technologies for processing data at a high speed within the heterogeneous computing environment are being developed.

SUMMARY

Embodiments of the present disclosure provide a memory expander with improved performance, a host device using the memory expander, and an operation method of a server system including the memory expander and the host device.

According to an embodiment, a memory expander includes a memory device that includes a first memory region corresponding to a first host and a second memory region corresponding to a second host. A controller communicates with the first host and the second host through a compute express link (CXL) interface. The controller receives a first CXL communication packet from the first host and performs a target data transfer operation of transferring target data stored in the first memory region to the second memory region, in response to the first CXL communication packet thus received.

According to an embodiment, a host device includes a first virtual machine that generates a first communication packet for providing target data to an external virtual machine. A first switch generates a second communication packet based on the first communication packet. A first heterogeneous network interface controller provides the second communication packet to an external memory expander through a heterogeneous network interface. A network interface controller communicates with an external host device over a network, and the external virtual machine is driven on the external host device connected with the external memory expander through the heterogeneous network interface.

According to an embodiment, an operation method of a server system—which includes a memory expander, a first host connected with the memory expander, and a second host connected with the memory expander—includes generating by the first host a first communication packet, generating by the first host a second communication packet based on the first communication packet, receiving by the memory expander the second communication packet through a heterogeneous computing interface, transferring by the memory expander target data from a first memory region corresponding to the first host to a second memory region corresponding to the second host in response to the second communication packet, generating by the memory expander a third communication packet, receiving by the second host the third communication packet through the heterogeneous computing interface, and generating by the second host a fourth communication packet based on the third communication packet. The first communication packet and the fourth communication packet are transmission control protocol/Internet protocol (TCP/IP) protocol-based communication packets, and the second communication packet and the third communication packet are compute express link (CXL) protocol-based communication packets.

BRIEF DESCRIPTION OF THE FIGURES

The above and other objects and features of the present disclosure will become apparent by describing in detail embodiments thereof with reference to the accompanying drawings.

FIG. 7 is a diagram illustrating a structure of a CXL header of FIG. 6.

DETAILED DESCRIPTION

Below, embodiments of the present disclosure may be described in detail and clearly to such an extent that one skilled in the art easily implements the present disclosure.

Figure 1:
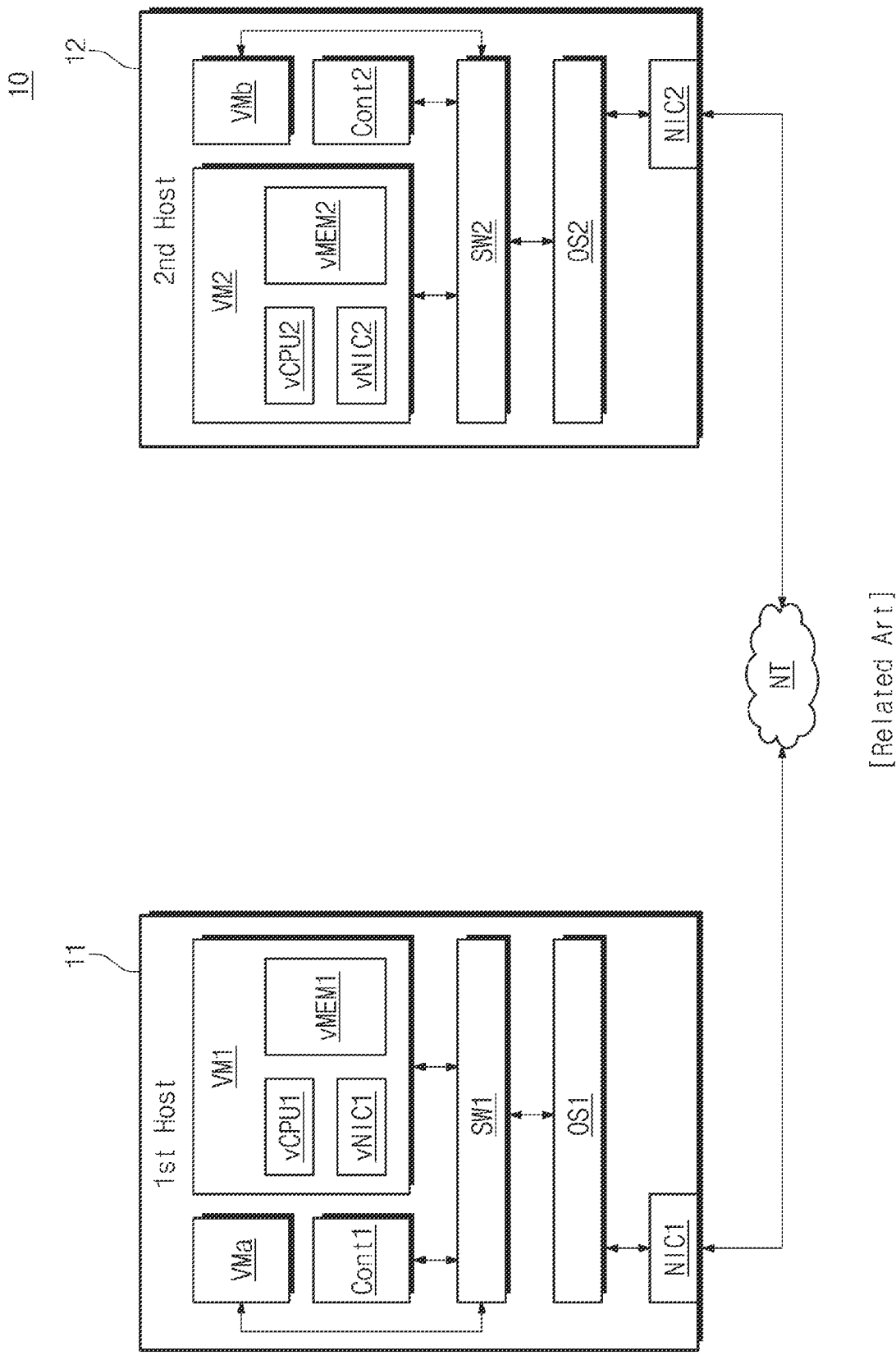
FIG. 1 is a block diagram illustrating a server system according to an embodiment of the present disclosure.

FIG. 1 is a block diagram illustrating a server system according to an embodiment of the present disclosure. Referring to FIG. 1, a server system 10 may include a first host 11 and a second host 12. In an embodiment, the server system 10 may be a system which stores/manages various kinds of data or provides a service to a client, such as a data center.

Below, to describe the technical idea of the disclosure easily, embodiments of the present disclosure will be described with reference to a virtualized system. Components illustrated in drawings may be virtualized components, but the present disclosure is not limited thereto. For example, a first virtual machine VM1 of the first host 11 may be a virtual system that is implemented by using all or a part of physical resources (e.g., a physical processor, a physical memory, and a physical peripheral device) included in the first host 11. That is, a first virtual CPU vCPU1 may be a virtualized component that performs processing based on the whole or a part of a physical processor included in the first host 11, and a first virtual memory vMEM1 may be a virtualized component that is configured to store/output data based on the whole or a part of a physical memory included in the first host 11. Various virtualized components may share the same physical resource or one physical resource may be distributed or allocated to virtualized components. However, the present disclosure is not limited to the above description, and various components disclosed in the detailed description should be comprehended as technical features that are understood by one skilled in the art depending on the context of the detailed description.

The first host 11 may include a first operating system OS1, a plurality of virtual machines VM1 and VMa, a container Cont1, a first switch SW1, and a first network interface controller NIC1. The first operating system OS1 may be driven on the first host 11 and may control or manage overall operations of the first host 11.

The plurality of virtual machines VM1 and VMa may be a virtual system that is driven on the first operating system OS1. The plurality of virtual machines VM1 and VMa may drive independent or individual operating systems, respectively. For example, the first virtual machine VM1 may include the first virtual CPU vCPU1, the first virtual memory vMEM1, and a first virtual network interface controller vNIC1.

The first virtual CPU vCPU1 may be configured to perform various operations that are driven by the first virtual machine VM1. The first virtual memory vMEM1 may be configured to store data that are used or generated at the first virtual memory vMEM1. The first virtual network interface controller vNIC1 may be configured to control communication between the first virtual machine VM1 and external components. In an embodiment, the first virtual network interface controller vNIC1 may be configured to generate or process a communication request or a communication packet complying with a TCP/IP protocol. However, the present disclosure is not limited thereto. For example, the first virtual network interface controller vNIC1 may operate based on various communication protocols.

Structures of the other virtual machines (e.g., VMa) of the plurality of virtual machines VM1 and VMa may be similar to the structure of the first virtual machine VM1 described above, and thus, additional description will be omitted to avoid redundancy.

The container Cont1 may include various applications that are driven on the first operating system OS1 of the first host 11. In an embodiment, each of the plurality of virtual machines VM1 and VMa may execute an independent virtual operating system, while the container Cont1 may be driven on the first operating system OS1 of the first host 11 or may share the first operating system OS1. In the remaining configurations other than a configuration of an operating system, the container Cont1 may have a structure similar to that of the first virtual machine VM1, and thus, additional description will be omitted to avoid redundancy. In an embodiment, the number of virtual machines to be driven by the first host 11 and the number of containers to be driven by the first host 11 may be variously changed or modified.

The first switch SW1 may be configured to perform a function of arbitrating, switching, or routing various communication requests or various communication packets. The first switch SW1 may be a physical switch or a virtual switch. The first switch SW1 may perform a function of arbitrating, switching, or routing communications between various components (e.g., virtual machines and containers) included in the first host 11 or communications between hosts (e.g., the first and second hosts 11 and 12).

For example, the first switch SW1 may be configured to receive a communication request from the plurality of virtual machines VM1 and VMa or the first container Cont1 and to perform switching or routing on the received communication request. In detail, in the case where a communication packet associated with the virtual machine VMa included in the same host (e.g., the first host 11) is generated from the first virtual machine VM1, the first switch SW1 may provide the communication request from the first virtual machine VM1 to the virtual machine VMa. Alternatively, in the case where a communication request associated with a second virtual machine VM2 included in another host (e.g., the second host 12) is generated by the first virtual machine VM1, the first switch SW1 may provide the communication request from the first virtual machine VM1 to the first operating system OS1. The first operating system OS1 may transfer the communication request from the first switch SW1 to the second host 12 through the first network interface controller NIC1 and a network NT.

The first network interface controller NIC1 may be configured to control communication between the first host 11 and the second host 12. The first network interface controller NIC1 may be configured to generate or process a communication request or a communication packet complying with the TCP/IP protocol. However, the present disclosure is not limited thereto.

The second host 12 may include a second operating system OS2, a plurality of virtual machines VM2 and VMb, a container Cont2, a second switch SW2, and a second network interface controller NIC2. The second virtual machine VM2 may include a second virtual central processing unit vCPU2, a second virtual memory vMEM2, and a second virtual network interface controller vNIC2. The components included in the second host 12 are the same as or similar to the components included in the first host 11, and thus, additional description will be omitted to avoid redundancy.

In an embodiment, the first and second hosts 11 and 12 may be computing devices physically separated from each other. Alternatively, the first and second hosts 11 and 12 may be systems logically divided within the same computing device. That is, the first and second hosts 11 and 12 may be classified based on operating systems (i.e., host operating systems) respectively driven thereon. In other words, each of the first and second hosts 11 and 12 may be a system that drives an independent host operating system.

In an embodiment, the first host 11 and the second host 12 may communicate with each other through the network NT. For example, through the network NT, the first host 11 may provide data to the second host 12 or may receive data from the second host 12. In an embodiment, the network NT may be a storage dedicated network such as a storage area network (SAN) or may be an Internet network such as a TCP/IP. In an embodiment, the network NT may include at least one of various communication protocols such as Ethernet protocol, Fibre channel, iSCSI protocol, FCoE, NAS, and NVMe-oF.

The first virtual machine VM1 of the first host 11 may communicate with the second virtual machine VM2 of the second host 12. For example, the first virtual machine VM1 may transmit data to the second virtual machine VM2. In this case, the first virtual machine VM1 may generate a communication packet including data stored in the first virtual memory vMEM1 and the communication packet is transferred to the network NT through the first switch SW1, the first operating system OS1, and the first network interface controller NIC1. The second virtual machine VM2 of the second host 12 may receive a communication packet through the network NT, the second network interface controller NIC2 the second operating system OS2, and the second switch SW2 and may obtain data from the first virtual machine VM1 based on the received communication packet.

Figure 2:
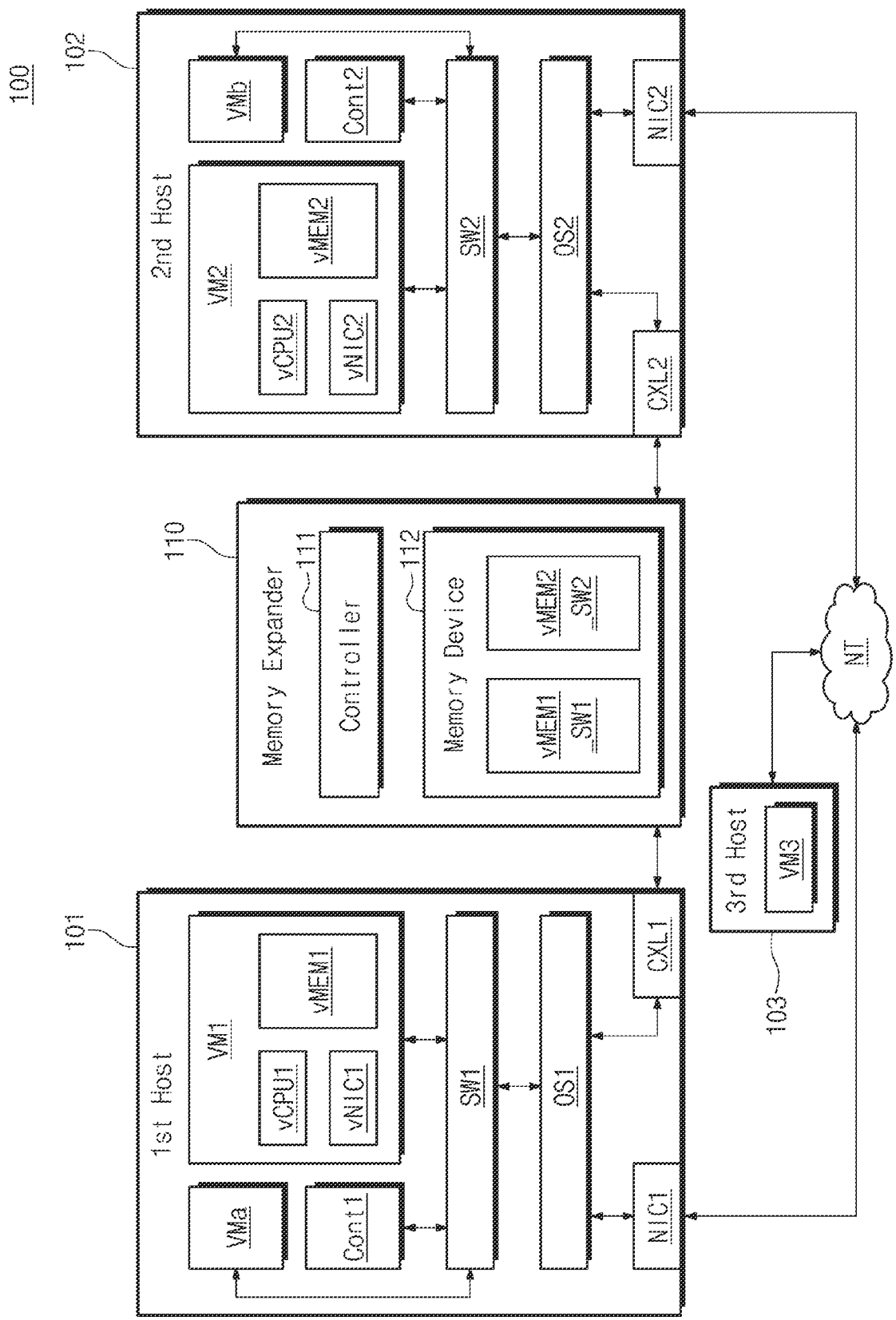
FIG. 2 is a block diagram illustrating a server system according to an embodiment of the present disclosure.

FIG. 2 is a block diagram illustrating a server system according to an embodiment of the present disclosure. For convenience of description, additional description associated with the components described above will be omitted to avoid redundancy. Referring to FIG. 2, a server system 100 may include a first host 101, a second host 102, a third host 103, and a memory expander 110. The first to third hosts 101 to 103 may communicate with each other over the network NT.

The first host 101 may include the first operating system OS1, the plurality of virtual machines VM1 and VMa, the container Cont1, the first switch SW1, the first network interface controller NIC1, and a first heterogeneous computing interface controller CXL1. The first operating system OS1, the plurality of virtual machines VM1 and VMa, the container Cont1, the first switch SW1, and the first network interface controller NIC1 are similar to those described above, and thus, additional description will be omitted to avoid redundancy. The first heterogeneous computing interface controller CXL1 may be an interface circuit configured to support a heterogeneous computing interface such as a compute express link (CXL) interface. In an embodiment, the heterogeneous computing interface may be an interface complying with the CXL protocol, but the present disclosure is not limited thereto. For example, the heterogeneous computing interface may be implemented based on at least one of various computing interfaces such as a Gen-Z protocol, an NVLink protocol, a CCIX protocol, and an Open CAPI protocol.

The second host 102 may include the second operating system OS2, the plurality of virtual machines VM2 and VMb, the container Cont2, the second switch SW2, the second network interface controller NIC2, and a second heterogeneous computing interface controller CXL2. The second operating system OS2, the plurality of virtual machines VM2 and VMb, the container Cont2, the second switch SW2, and the second network interface controller NIC2 are similar to those described above, and thus, additional description will be omitted to avoid redundancy.

The third host 103 may include a third virtual machine VM3. The third virtual machine VM3 is similar to the virtual machines VM1 and VM2 described above, and thus, additional description will be omitted to avoid redundancy. Although not illustrated in FIG. 2, the third host 103 may have a structure similar to that of the first host 101 or the second host 102.

The memory expander 110 may communicate with the first and second hosts 101 and 102 through a heterogeneous computing interface. Below, to describe technical features of the present disclosure easily, it is assumed that a communication interface between the hosts 101 and 102 and the memory expander 110 is a CXL protocol-based interface.

Below, for convenience of description, it is assumed that communications between various components are performed in the form of exchanging packets. That is, the communication between the first virtual machine VM1 and the second virtual machine VM2 may be performed by exchanging communication packets or packets including a variety of information.

The memory expander 110 may include a controller 111 and a memory device 112. The controller 111 may receive packets from the first and second hosts 101 and 102 through the CXL interface and may control the memory device 112 based on the received packets. Under control of the controller 111, the memory device 112 may store data or may output the stored data. In an embodiment, the memory device 112 may be a device that is based on a volatile memory, such as a static random access memory (SRAM) or a dynamic RAM (DRAM), a nonvolatile memory, such as a NAND flash memory, a magnetic RAM (MRAM), a phase change RAM (PRAM) or a resistive RAM (RRAM), or a combination thereof.

In an embodiment, the memory expander 110 may be a memory that corresponds to a Type 3 device defined by the CXL protocol standard. For example, through the CXL interface, the memory expander 110 may operate as system memories or host memories of the first and second hosts 101 and 102 or as a memory that is managed by a host.

In an embodiment, the memory device 112 of the memory expander 110 may include a first virtual switch memory vMEM_SW1 and a second virtual switch memory vMEM_SW2. The first virtual switch memory vMEM_SW1 may indicate a memory region that is used or managed by the first switch SW1 of the first host 101 or corresponds to the first switch SW1. The second virtual switch memory vMEM_SW2 may indicate a memory region that is used or managed by the second switch SW2 of the second host 102 or corresponds to the second switch SW2.

Below, to describe technical features of the present disclosure easily, embodiments of the present disclosure will be described with reference to communications between the first virtual machine VM1 of the first host 101 and the second virtual machine VM2 of the second host 102. However, the present disclosure is not limited thereto. For example, the technical features of the present disclosure may be applied to communications between virtualized components of the first host 101 and virtualized components of the second host 102.

According to the embodiment described with reference to FIG. 1, the communication between the first and second virtual machines VM1 and VM2 is performed over the network NT. Because communication traffic associated with other hosts or other virtualized components is concentrated on the network NT, a speed at which the first and second virtual machines VM1 and VM2 communicate with each other over the network NT may decrease.

In contrast, according to the embodiment of FIG. 2, the first virtual machine VM1 and the second virtual machine VM2 may communicate with each other through the CXL interface and the memory expander 110. That is, as the communication between the first virtual machine VM1 and the second virtual machine VM2 is performed through the CXL interface and the memory expander 110, the communication between the first virtual machine VM1 and the second virtual machine VM2 may be accelerated.

For example, the communication for transmitting target data from the first virtual machine VM1 to the second virtual machine VM2 may be performed. In this case, the target data may be data that are generated or managed by the first virtual machine VM1. The target data may be stored in the first virtual memory vMEM1.

The first virtual machine VM1 may generate a communication packet for transferring the target data stored in the first virtual memory vMEM1 to the second virtual machine VM2. In an embodiment, the communication packet may be generated by the first virtual network interface controller vNIC1 of the first virtual machine VM1 and may have a TCP/IP protocol-based format.

The communication packet generated by the first virtual machine VM1 may be transferred to the first switch SW1. The first switch SW1 may check a destination of the communication packet based on information (e.g., an IP header) included in the communication packet. When the checked destination is the second virtual machine VM2, the first switch SW1 may generate a CXL communication packet based on the communication packet. In an embodiment, the first switch SW1 may generate the CXL communication packet by adding a CXL protocol-based CXL header to a portion of the communication packet. The generated CXL communication packet may be transferred to the first operating system OS1. The first operating system OS1 may output the CXL communication packet through a first CXL interface controller CXL1.

The memory expander 110 may receive the CXL communication packet output from the first CXL interface controller CXL1. The memory expander 110 may store target data included in the CXL communication packet in the first virtual switch memory vMEM_SW1 in response to the CXL communication packet. Afterwards, the memory expander 110 may receive another CXL communication packet from the first switch SW1 and may transfer the target data stored in the first virtual switch memory vMEM_SW1 to the second virtual switch memory vMEM_SW2 in response to the other CXL communication packet. In an embodiment, target data may be transferred by using the following ways: a way to physically copy target data, a way to refer to an address of the target data, and a way to copy the target data to a shared region.

After the target data are completely transferred, the memory expander 110 may transfer a second CXL communication packet to the second host 102 through the CXL interface. In an embodiment, the second CXL communication packet may be a packet including the target data stored in the second virtual switch memory vMEM_SW2. Alternatively, the second CXL communication packet may be a communication packet providing notification that the target data are stored in the second virtual switch memory vMEM_SW2. The second operating system OS2 of the second host 102 may receive the second CXL communication packet through a second CXL interface controller CXL2 and may transfer the second CXL communication packet to the second switch SW2. The second switch SW2 may generate a TCP/IP communication packet based on the second CXL communication packet and may transfer the TCP/IP communication packet to the second virtual machine VM2. The second virtual machine VM2 may store the target data in the second virtual memory vMEM2 in response to the received TCP/IP communication packet. Alternatively, the second virtual machine VM2 may check that the target data are in the second virtual switch memory vMEM_SW2 of the memory expander 110, in response to the received TCP/IP communication packet. In this case, the second virtual machine VM2 may read the target data stored in (or referred to) the second virtual switch memory vMEM_SW2 through the second CXL interface controller CXL2.

In an embodiment, the communication between the first virtual machine VM1 and the first switch SW1 and the communication between the second virtual machine VM2 and the second switch SW2 may be performed through a TCP/IP protocol-based communication packet, and the communication between the first host 101 and the memory expander 110 and the communication between the second host 102 and the memory expander 110 may be performed through a CXL protocol-based communication packet. As described above, because the communication between the first and second virtual machines VM1 and VM2 is performed not through the network NT but through a heterogeneous computing interface (e.g., a CXL interface) and the memory expander 110, a communication speed between the first and second virtual machines VM1 and VM2 may be improved.

In an embodiment, the first host 101 and the third host 103 may be connected only over the network NT. In this case, when the first virtual machine VM1 of the first host 101 communicates with the third virtual machine VM3 of the third host 103, the first switch SW1 may not perform separate processing on a communication packet from the first virtual machine VM1 (i.e., may not generate the CXL protocol-based CXL communication packet with regard to the communication packet from the first virtual machine VM1). That is, the first virtual machine VM1 and the third virtual machine VM3 may communicate with each other over the network NT.

In an embodiment, as described above, the communication between the first virtual machine VM1 and the second virtual machine VM2 may be performed through the CXL interface and the memory expander 110. Accordingly, the communication between virtual machines may be accelerated. In an embodiment, the communication between the first operating system OS1 and the second operating system OS2, which correspond to lower layers than virtual switches, may be performed through the memory expander 110 or over the network NT.

Figure 3:
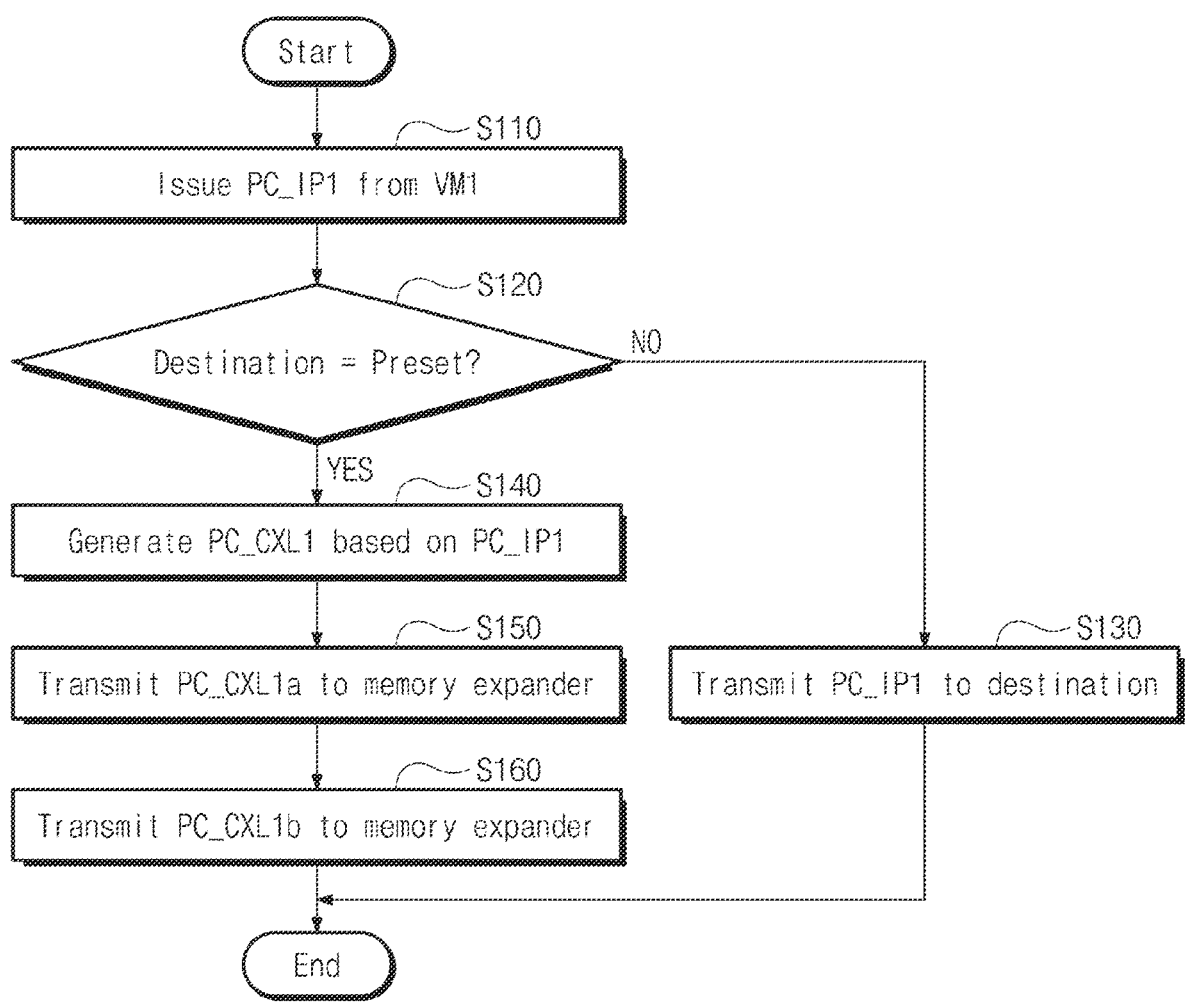
FIG. 3 is a flowchart illustrating an operation of a first host of FIG. 2.

FIG. 3 is a flowchart illustrating an operation of a first host of FIG. 2. Below, to describe technical features of the present disclosure easily, embodiments of the present disclosure will be described with reference to a configuration where the first virtual machine VM1 stores or manages target data TD and the first virtual machine VM1 transmits the target data TD to the second virtual machine VM2. However, the present disclosure is not limited thereto. For example, the technical features of the present disclosure will be applied to various communications between virtualized components.

Referring to FIGS. 2 and 3, in operation S110, the first host 101 may generate a first IP communication packet PC_IP1. For example, the first virtual machine VM1 of the first host 101 may generate the first IP communication packet PC_IP1 for transmitting the target data TD to the second virtual machine VM2. The first IP communication packet PC_IP1 may include target data. The first IP communication packet PC_IP1 may be a communication packet based on a TCP/IP protocol.

In operation S120, the first host 101 may determine whether a destination (or a target) of the first IP communication packet PC_IP1 corresponds to a preset virtual machine (e.g., the second virtual machine VM2). For example, the first switch SW1 may check a destination of the first IP communication packet PC_IP1 based on a header (e.g., an Ethernet header, an IP header, or a TCP header) of the first IP communication packet PC_IP1. The first switch SW1 may compare the checked destination with information of the preset virtual machine. In an embodiment, the preset virtual machine may be a virtual machine (or any other virtualized component) included in a host (e.g., the second host 102) that drives a host operating system different from a source (e.g., the first virtual machine VM1) of the first IP communication packet PC_IP1 and is connected with the memory expander 110 through the CXL interface.

When the destination of the first IP communication packet PC_IP1 does not correspond to the preset virtual machine, in operation S130, the first host 101 may transfer the first IP communication packet PC_IP1 to the destination. In an embodiment, operation S130 may be performed by a routing operation of the first switch SW1 included in the first host 101 or may be performed by using the network NT. For example, when the destination of the first IP communication packet PC_IP1 corresponds to another virtual machine or container included in the first host 101, the first switch SW1 may transfer the first IP communication packet PC_IP1 to the other virtual machine or container included in the first host 101. Alternatively, when the destination of the first IP communication packet PC_IP1 corresponds to another host (e.g., a virtual machine or a container of the third host 103 not connected with the memory expander 110), the first host 101 may transmit the first IP communication packet PC_IP1 to the network NT through the first network interface controller NIC1 and the first IP communication packet PC_IP1 may be provided to the destination over the network NT.

When the destination of the first IP communication packet PC_IP1 corresponds to the preset virtual machine, in operation S140, the first host 101 may generate a first CXL communication packet PC_CXL1 based on the first IP communication packet PC_IP1. For example, the first switch SW1 may generate the first CXL communication packet PC_CXL1 by adding a CXL protocol-based CXL header to a portion of the first IP communication packet PC_IP1.

In operation S150, the first host 101 may transmit a (1–a)-th CXL communication packet PC_CXL1a to the memory expander 110. For example, the first operating system OS1 of the first host 101 may receive the (1–a)-th CXL communication packet PC_CXL1a from the first switch SW1 and may transmit the (1–a)-th CXL communication packet PC_CXL1a to the memory expander 110 through the first CXL interface controller CXL1.

In operation S160, the first host 101 may transmit a (1–b)-th CXL communication packet PC_CXL1b to the memory expander 110. For example, the first operating system OS1 of the first host 101 may receive the (1–b)-th CXL communication packet PC_CXL1b from the first switch SW1 and may transmit the (1–b)-th CXL communication packet PC_CXL1b to the memory expander 110 through the first CXL interface controller CXL1. In an embodiment, the (1–a)-th CXL communication packet PC_CXL1a may be a communication packet for storing target data in the first virtual switch memory vMEM_SW1 and the (1–b)-th CXL communication packet PC_CXL1b may be a communication packet for copying the target data from the first virtual switch memory vMEM_SW1 to the second virtual switch memory vMEM_SW2 (or for referring to the second virtual switch memory vMEM_SW2 or for sharing the target data). As described above, based on the destination of the first IP communication packet PC_IP1 generated from the first virtual machine VM1, the first host 101 or the first switch SW1 of the first host 101 may change a format of the first IP communication packet PC_IP1 or may hook the first IP communication packet PC_IP1 so as to be transferred to the memory expander 110.

Figure 4:
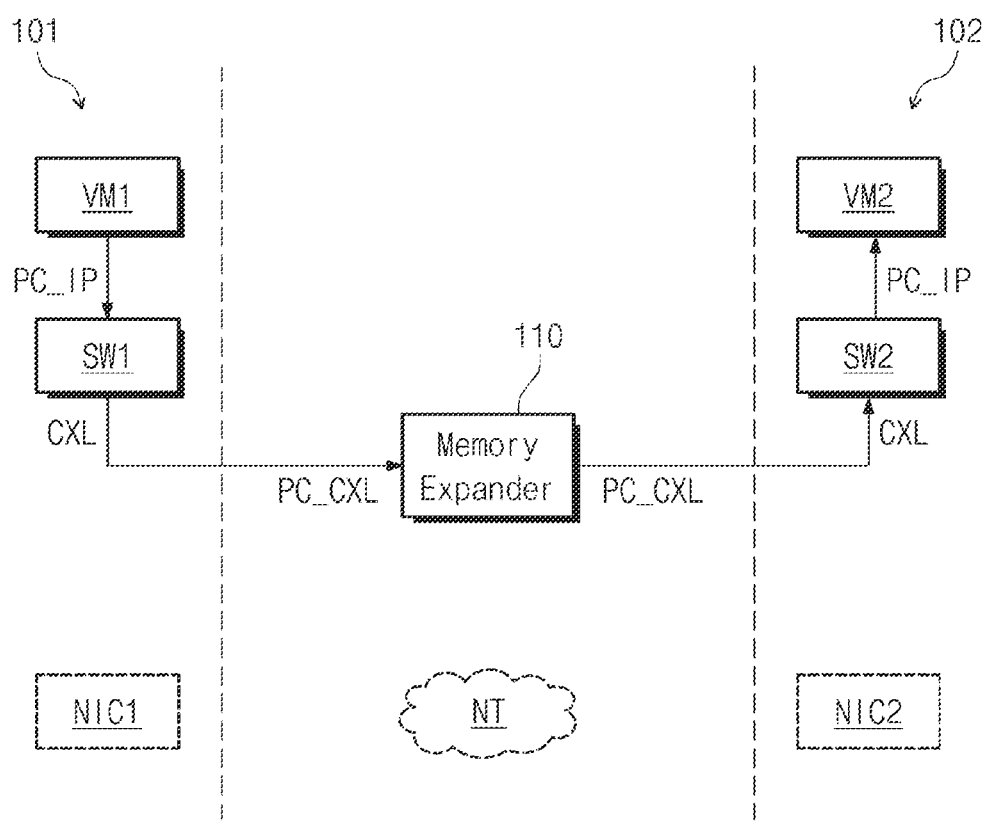
FIG. 4 is a diagram conceptually illustrating an operation of transmitting target data from a first virtual machine to a second virtual machine, in a server system of FIG. 2.

FIG. 4 is a diagram conceptually illustrating an operation of transmitting target data from the first virtual machine VM1 to the second virtual machine VM2, in a server system of FIG. 2. For convenience of description, additional description associated with the components described above will be omitted to avoid redundancy. Referring to FIGS. 2 and 4, the first virtual machine VM1 of the first host 101 may generate an IP communication packet PC_IP that is based on the TCP/IP protocol. The first switch SW1 of the first host 101 may generate a CXL communication packet PC_CXL based on the IP communication packet PC_IP from the first virtual machine VM1 and may transmit the CXL communication packet PC_CXL to the memory expander 110 through the CXL interface. The memory expander 110 may perform an operation corresponding to the CXL communication packet PC_CXL from the first host 101, may generate the CXL communication packet PC_CXL, and may transmit the CXL communication packet PC_CXL to the second host 102 through the CXL interface. The second switch SW2 may generate the IP communication packet PC_IP based on the CXL communication packet PC_CXL and may transmit the IP communication packet PC_IP to the second virtual machine VM2.

As illustrated in FIG. 4, as in the conventional communication manner, layers of the first virtual machine VM1 of the first host 101 and the second virtual machine VM2 of the second host 102 may perform TCP/IP protocol-based communications. In contrast, the physical communication between the first and second hosts 101 and 102 may be performed based on the CXL protocol, instead of using the network interface controllers NIC1 and NIC2 and the network NT. Accordingly, the communication between the first and second virtual machines VM1 and VM2 may be accelerated.

Figure 5A:
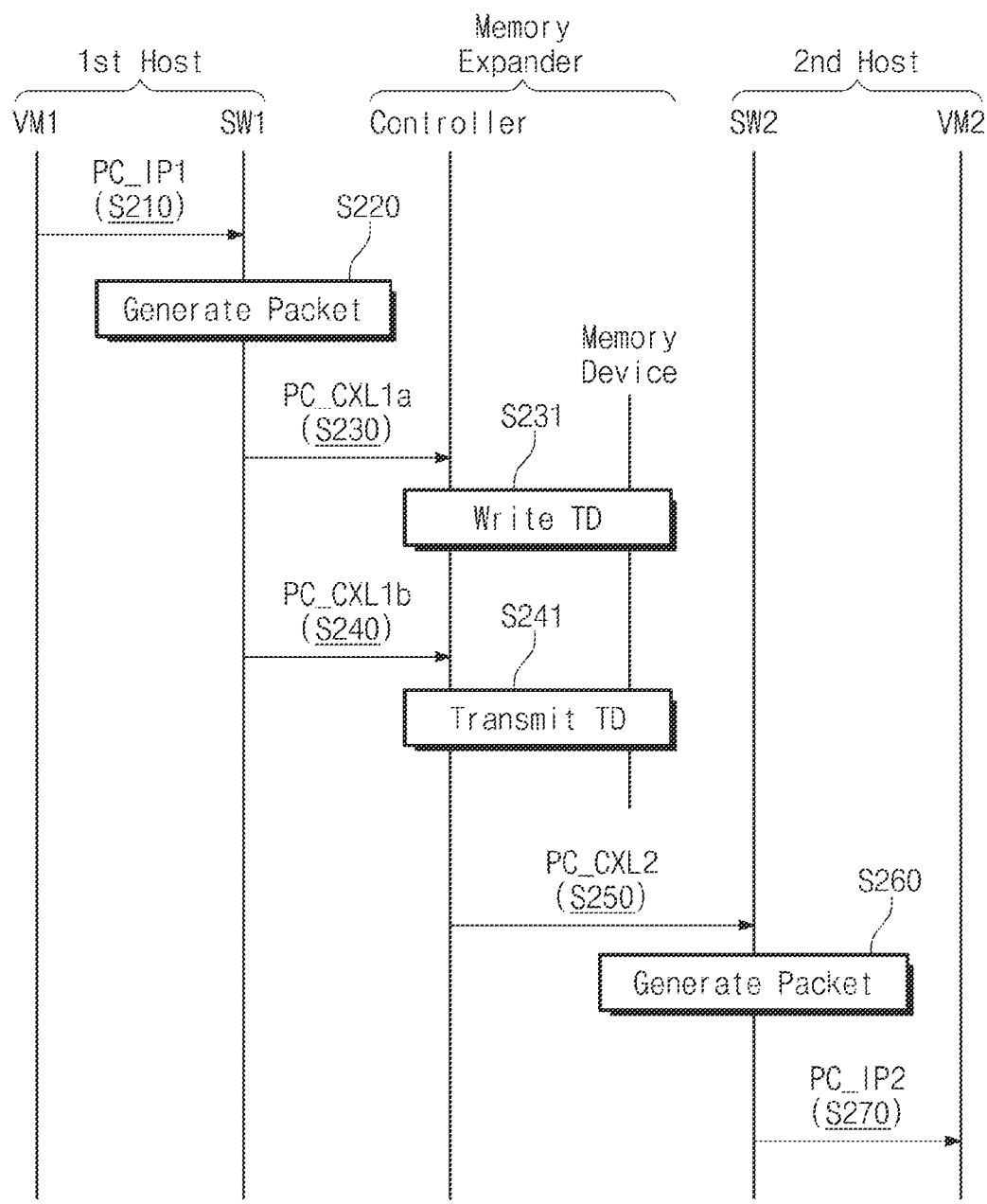
FIGS. 5A and 5B are flowcharts illustrating an operation of a server system of FIG. 2.
Figure 5B:
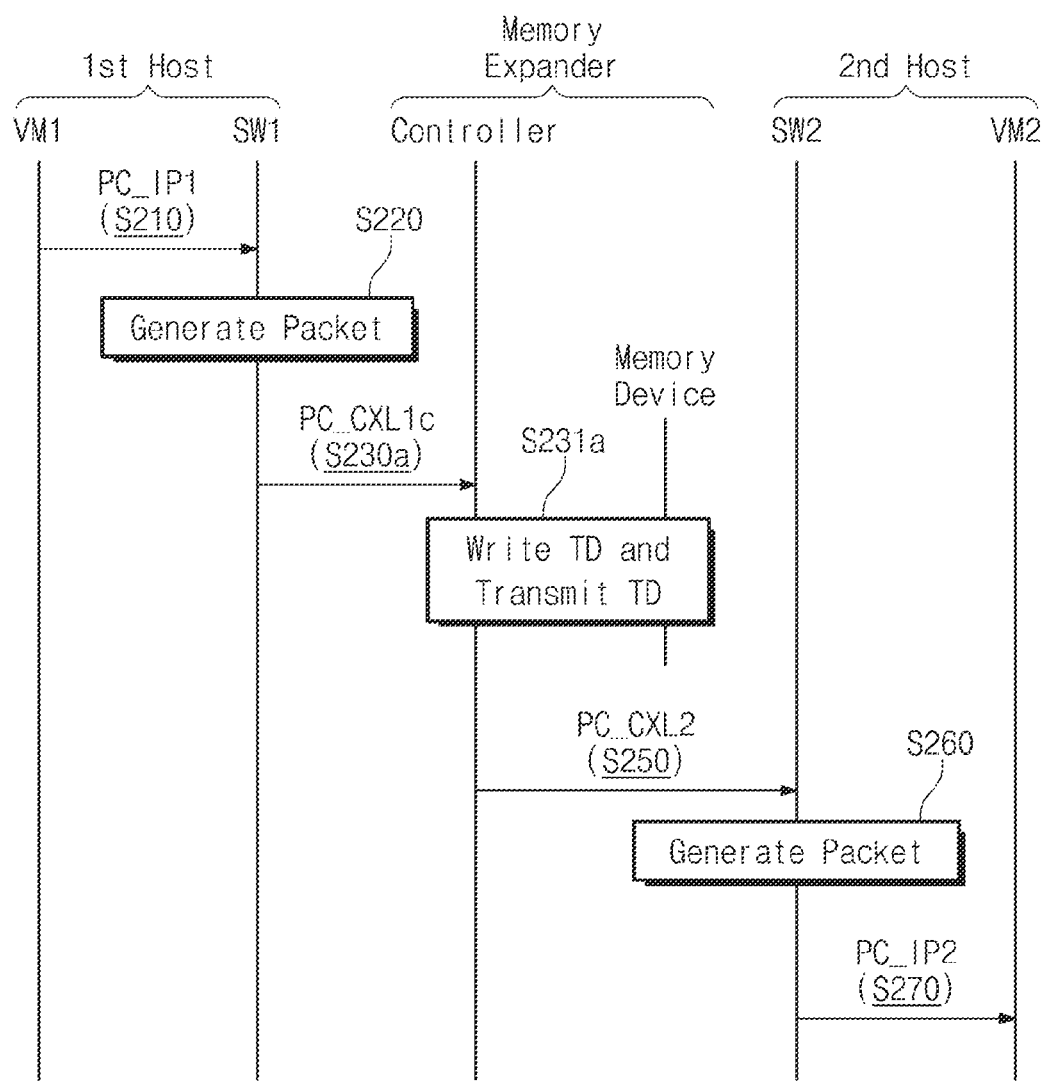

FIGS. 5A and 5B are flowcharts illustrating an operation of a server system of FIG. 2. As in the above description, for convenience of description, an operation where the target data TD are transmitted from the first virtual machine VM1 to the second virtual machine VM2 will be described. In an embodiment, target data transfer operations according to the flowcharts of FIGS. 5A and 5B may be performed in response to an explicit request of the second virtual machine VM2 for the target data TD. In this case, a target data request from the second virtual machine VM2 may be transmitted through the CXL interface and the memory expander 110. Alternatively, the target data request may be transmitted over the network NT, and the target data TD may be transmitted through the CXL interface and the memory expander 110. Alternatively, the target data transfer operation according to the flowchart of FIG. 5A or 5B may be initiated in response to an operation or a request of any other virtual machine(s).

Referring to FIGS. 2 and 5A, in operation S210, the first virtual machine VM1 of the first host 101 may generate the first IP communication packet PC_IP1. The first IP communication packet PC_IP1 may be a communication packet for providing the target data TD to the second virtual machine VM2. The first IP communication packet PC_IP1 may be of a packet structure based on the TCP/IP protocol. The first IP communication packet PC_IP1 may include the target data TD that are stored in the first virtual memory vMEM1.

In operation S220, the first switch SW1 may generate the first CXL communication packet PC_CXL1 based on the first IP communication packet PC_IP1. For example, the first switch SW1 may generate the first CXL communication packet PC_CXL1 by adding a CXL protocol-based CXL header to a portion of the first IP communication packet PC_IP1. In an embodiment, the number of first IP communication packets PC_IP1 and the number of first CXL communication packets PC_CXL1 may be changed depending on the size of the target data TD or an operation manner.

In operation S230, the (1-a)-th CXL communication packet PC_CXL1a may be provided to the controller 111 of the memory expander 110. For example, the first switch SW1 may provide the (1-a)-th CXL communication packet PC_CXL1a to the first operating system OS1. The first operating system OS1 may transmit the (1-a)-th CXL communication packet PC_CXL1a to the memory expander 110 through the first CXL interface controller CXL1. In an embodiment, the first switch SW1 may be directly connected with the first CXL interface controller CXL1 through the CXL interface and the first switch SW1 may directly transmit the (1-a)-th CXL communication packet PC_CXL1a to the memory expander 110 through the first CXL interface controller CXL1. In an embodiment, the (1-a)-th CXL communication packet PC_CXL1a may include the target data TD.

In operation S231, the controller 111 of the memory expander 110 may store the target data TD in response to the (1-a)-th CXL communication packet PC_CXL1a. For example, the controller 111 may store the target data TD in a memory region (e.g., the first virtual switch memory vMEM_SW1) based on a CXL header of the (1-a)-th CXL communication packet PC_CXL1a.

In operation S240, the (1-b)-th CXL communication packet PC_CXL1b may be provided to the controller 111 of the memory expander 110. The (1-b)-th CXL communication packet PC_CXL1b may be provided in a manner similar to that of the (1-a)-th CXL communication packet PC_CXL1a in operation S230, and thus, additional description will be omitted to avoid redundancy. In an embodiment, the (1-b)-th CXL communication packet PC_CXL1b may be a request for transferring the target data TD from the first virtual switch memory vMEM_SW1 to the second virtual switch memory vMEM_SW2.

In operation S241, the controller 111 of the memory expander 110 may transfer the target data TD stored in the first virtual switch memory vMEM_SW1 to the second virtual switch memory vMEM_SW2 in response to the (1-b)-th CXL communication packet PC_CXL1b. In an embodiment, the target data TD may be transferred through various operations, such as a copy operation, a reference operation, and a share operation, which will be more fully described with reference to the following drawings.

After the target data TD are completely transferred, in operation S250, the memory expander 110 may transmit the second CXL communication packet PC_CXL2 to the second host 102 through the CXL interface. In an embodiment, the second CXL communication packet PC_CXL2 may include the target data TD. Alternatively, the second CXL communication packet PC_CXL2 may include information providing notification that the target data TD are prepared in the second virtual switch memory vMEM_SW2.

In operation S260, the second switch SW2 may generate a second IP communication packet PC_IP2 based on the second CXL communication packet PC_CXL2. For example, the second switch SW2 may generate the second IP communication packet PC_IP2 by adding an Ethernet header to a portion of the second CXL communication packet PC_CXL2.

In operation S270, the second switch SW2 may provide the second IP communication packet PC_IP2 to the second virtual machine VM2 of the second host 102.

In an embodiment, the second IP communication packet PC_IP2 may be of a packet structure based on the TCP/IP protocol. The second virtual network interface controller vNIC2 of the second virtual machine VM2 may de-packetize the second IP communication packet PC_IP2 to identify the target data TD or to recognize that the target data TD are prepared in the second virtual switch memory vMEM_SW2 of the memory expander 110. In an embodiment, the second virtual machine VM2 may read the target data TD from the memory expander 110 through a read operation. In this case, the read operation may be performed through a CXL protocol-based communication.

Referring to FIGS. 2 and 5B, the first virtual machine VM1 and the first switch SW1 of the first host 101 may perform operation S210 and operation S220, and the controller 111 of the memory expander 110, the second switch SW2 of the second host 102, and the second virtual machine VM2 may perform operation S250 to operation S270. Operation S210, operation S220, and operation S250 to operation S270 are similar to those described with reference to FIG. 5A, and thus, additional description will be omitted to avoid redundancy.

After operation S220, in operation S230a, the first switch SW1 may provide a (1-c)-th CXL communication packet PC_CXL1c to the controller 111 of the memory expander 110. In operation S231a, the controller 111 of the memory expander 110 may perform operations of storing the target data TD in the first virtual switch memory vMEM_SW1 and transferring the target data TD from the first virtual switch memory vMEM_SW1 to the second virtual switch memory vMEM_SW2. In an embodiment, the operations of storing and transferring the target data TD may be performed by one CXL communication packet. The operations of storing and transferring the target data TD may be performed as an atomic operation.

In an embodiment, a structure of the (1-c)-th CXL communication packet PC_CXL1c may be similar to that of an M2S request with a data (RwD) message defined by the CXL protocol. That is, the (1-c)-th CXL communication packet PC_CXL1c may include the target data TD and at least a portion of a CXL header may include information about the transfer of target data.

Figure 6:
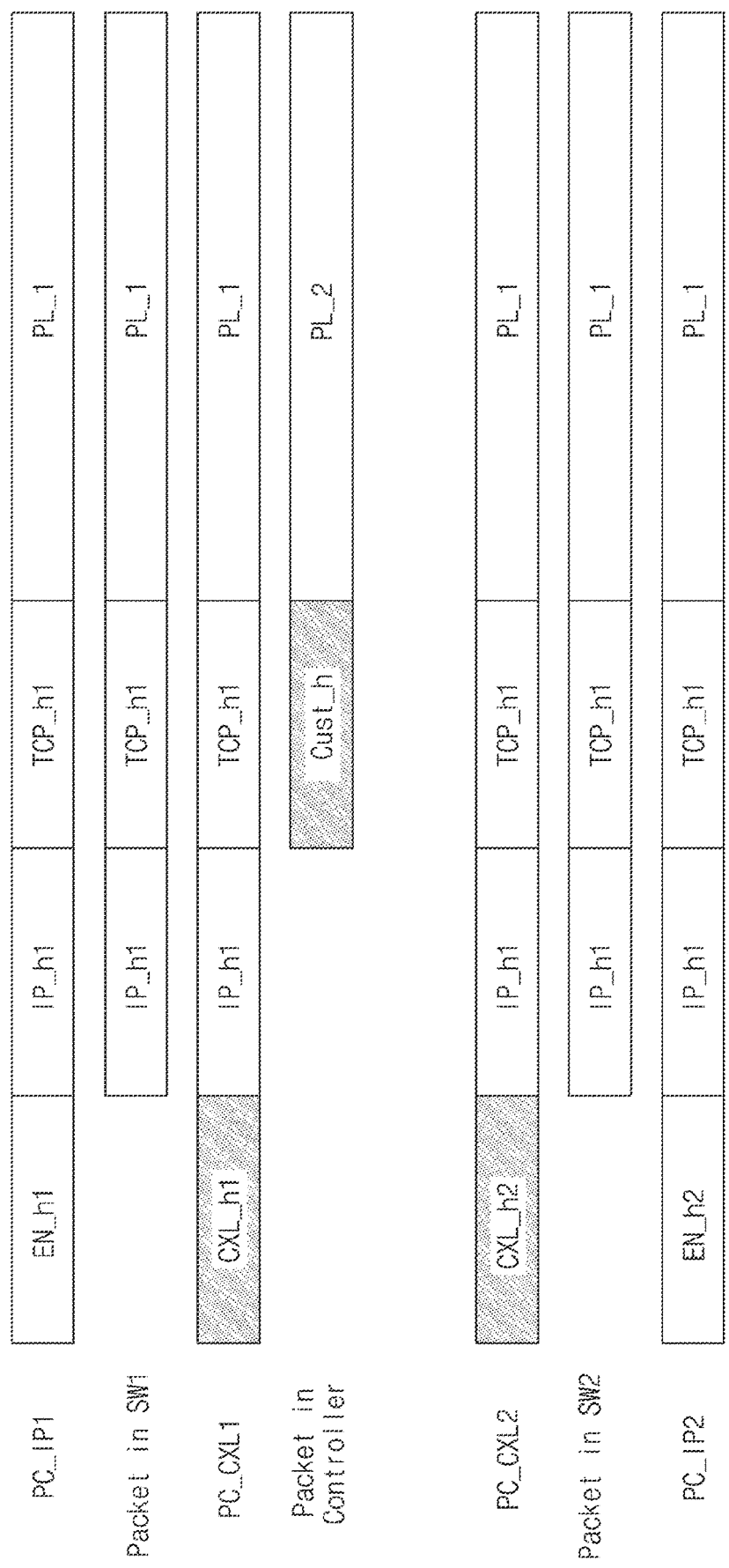
FIG. 6 is a diagram for describing a structure of a communication packet described in FIGS. 5A and 5B.

FIG. 6 is a diagram for describing a structure of a communication packet described in FIGS. 5A and 5B. FIG. 7 is a diagram illustrating a structure of a CXL header of FIG. 6. For convenience of description, a schematic structure of each communication packet will be described.

Referring to FIGS. 2, 5A, 5B, 6, and 7, the first IP communication packet PC_IP1 generated from the first virtual machine VM1 may include a first Ethernet header EN_h1, a first IP header IP_h1, a first TCP header TCP_h1, and a first payload PL_1. The first Ethernet header EN_h1 may include information for transmitting a packet from a source to a destination safely effectively, for example, information such as a destination MAC address (6B), a source MAC address (6B), and an Ethernet type (2B). The first IP header IP_h1 may include information such as a source IP address (4B) and a destination IP address (4B). The first TCP header TCP_h1 may include information such as a source port number (SP) and a destination port number (DP). The first payload PL_1 may include information about a communication packet, for example, the target data TD. A structure of the first IP communication packet PC_IP1 may be similar to a structure of a communication packet based on the TCP/IP protocol.

The first switch SW1 may interpret the first Ethernet header EN_h1 to check a destination of the first IP communication packet PC_IP1. When the destination of the first IP communication packet PC_IP1 corresponds to a preset virtual machine (e.g., VM2), the first switch SW1 may generate the first CXL communication packet PC_CXL1 by adding a first CXL header CXL_h1 to a portion (IP_h1, TCP_h1, PL_1) of the first IP communication packet PC_IP1. In an embodiment, in the first CXL communication packet PC_CXL1, information of IP_h1, TCP_h1, and PL_1 may be understood as a payload of the first CXL communication packet PC_CXL1.

In an embodiment, the first CXL header CXL_h1 may have a structure similar to a structure defined by the CXL protocol. For example, as illustrated in FIG. 7, the CXL header CXL_header may include fields such as a valid field Valid, a memory operation code field MEM Opcode, a metadata field MetaField, a metadata value field MetaValue, an SNP type field SNP Type, an address field Address, a tag field Tag, a TC field TC, and a reserved field RSVD.

The valid field Valid may include information indicating whether a CXL communication packet is valid. The memory operation code field MEM Opcode may include information about an operation to be performed on data. The metadata field MetaField may include information about metadata. The metadata value field MetaValue may include information about a metadata value. The SNP type field SNP Type may include information about a snoop type. The address field Address may include information about a physical address of a host, which is associated with a memory operation code. The tag field Tag may include information about a source entry previously allocated in a specific operation. The TC field TC may include information about a QoS of a communication packet. The reserved field RSVD may be a reserved field.

In an embodiment, the CXL header illustrated in FIG. 7 may include header information corresponding to an M2S request of the CXL protocol, but the present disclosure is not limited thereto.

In an embodiment, as described above, in the memory expander 110, the CXL communication packet PC_CXL may be used to transmit the target data TD from the first virtual switch memory vMEM_SW1 to the second virtual switch memory vMEM_SW2. In this case, the CXL communication packet PC_CXL may include the CXL header illustrated in FIG. 7. In this case, by changing values of some fields, a CXL communication packet for transmitting target data in the memory expander 110 may be generated.

For example, a copy operation, a reference operation, or a share operation associated with target data may be designated by designating a value of the memory operation code MEM Opcode to a specific value (e.g., "1001", "1010", or "1011").

The address field Address may include information about target data. For example, a first value address[1] of the address field Address may indicate a start memory address of original data (i.e., a start memory address of the first virtual switch memory vMEM_SW1 where the target data TD are stored), and a second value address[2] of the address field Address may indicate an end memory address of the original data (i.e., an end memory address of the first virtual switch memory vMEM_SW1 where the target data TD are stored). A third value address[3] of the address field Address may indicate a start memory address of a destination (i.e., a start memory address of the second virtual switch memory vMEM_SW2 to which the target data TD are to be transferred), and a fourth value address[4] of the address field Address may indicate an end memory address of the destination (i.e., an end memory address of the second virtual switch memory vMEM_SW2 to which the target data TD are to be transferred). A fifth value address[5] of the address field Address may include information about a data type, a length, and a checksum.

The reserved field RSVD may include information about a hold time of data to be transferred. In an embodiment, a value of the reserved field RSVD may be valid only when a value of the memory operation code MEM Opcode is set to a value corresponding to a reference operation or a share operation associated with target data.

In an embodiment, in the case where the memory expander 110 receives the CXL communication packet described with reference to FIG. 7, depending on a relevant operation manner, the memory expander 110 may transfer the target data TD from the first virtual switch memory vMEM_SW1 to the second virtual switch memory vMEM_SW2. In an embodiment, in the case of the reference operation or the share operation associated with target data, after a time set to the reserved field RSVD passes, the memory expander 110 may directly copy data targeted for sharing or reference to a destination memory (i.e., the second virtual switch memory vMEM_SW2).

Returning to FIG. 6, as described above, the memory expander 110 may receive the first CXL communication packet PC_CXL1 and may perform a target data transfer operation in response to the first CXL communication packet PC_CXL1. In this case, the controller 111 of the memory expander 110 may generate a communication packet including a custom header Cust_h and a second payload PL_2 and may perform the target data transfer operation based on the generated communication packet.

The custom header Cust_h may include values such as a source ID, a destination ID, a data type, a data length, a data checksum, and error check information. The second payload PL_2 may include information of IP_h1, TCP_h1, and PL_1 described above.

That is, the controller 111 of the memory expander 110 may perform the target data transfer operation that is performed within the memory device 112 by using the communication packet including the custom header Cust_h and the second payload PL_2.

The second CXL communication packet that is provided from the controller 111 to the second switch SW2 may be similar to the first CXL communication packet PC_CXL1 except that the second CXL communication packet PC_CXL2 includes a second CXL header CXL_h2, and thus, additional description will be omitted to avoid redundancy. In an embodiment, the second CXL header CXL_h2 of the second CXL communication packet PC_CXL2 may have a structure similar to a structure of an S2M Data Response (DRS) defined by the CXL protocol.

A communication packet processed within the second switch SW2 may be similar to the communication packet processed within the first switch SW1, which is described above, and thus, additional description will be omitted to avoid redundancy.

The second IP communication packet PC_IP2 is similar to the first IP communication packet PC_IP1 except for an Ethernet header EN_h2, and thus, additional description will be omitted to avoid redundancy.

As described above, according to an embodiment of the present disclosure, the communication between virtual machines may be performed based the CXL interface by changing a communication packet between virtual machines, which communicate with each other based on the TCP/IP protocol, to a CXL protocol-based communication packet. Accordingly, the communication between virtual machines may be accelerated.

Figure 8:
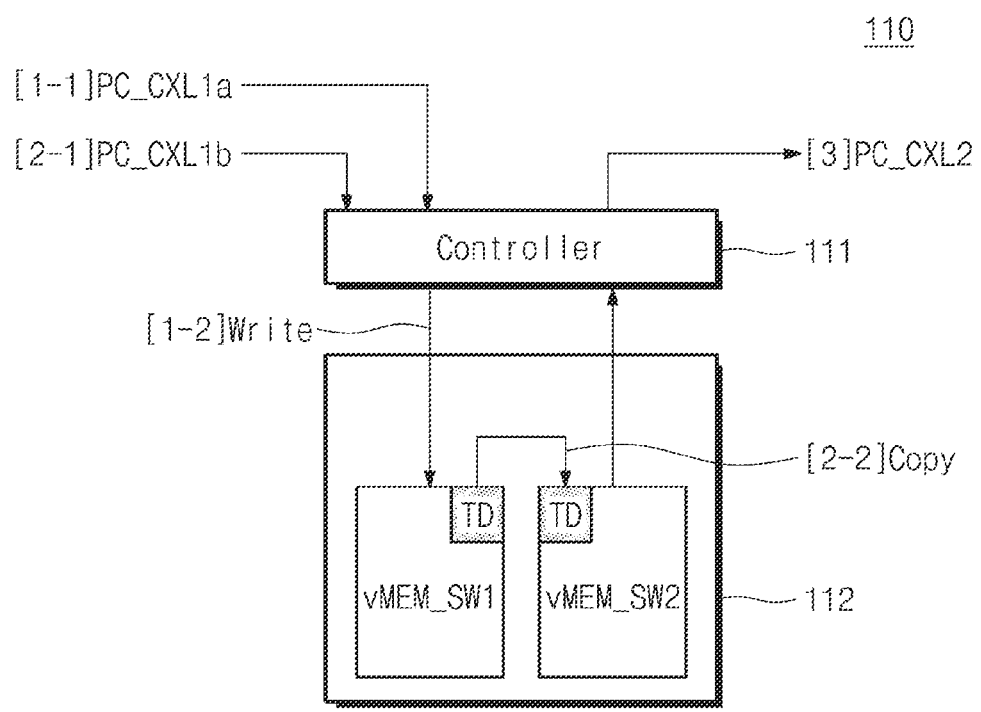
FIGS. 8 to 10 are block diagrams illustrating how a memory expander of FIG. 2 transfers target data.
Figure 9:
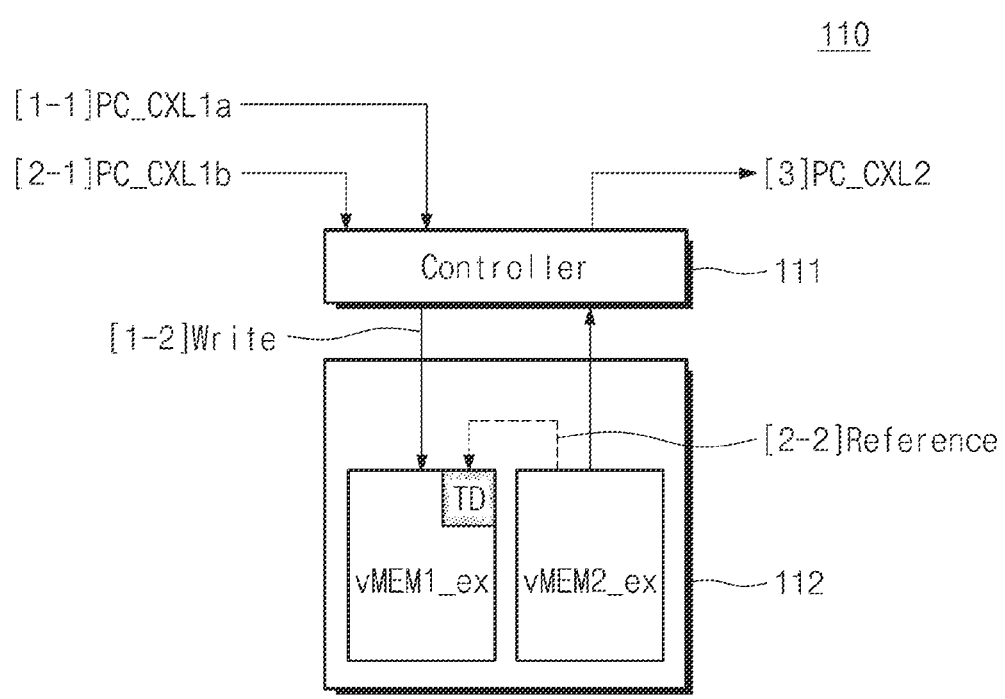
Figure 10:
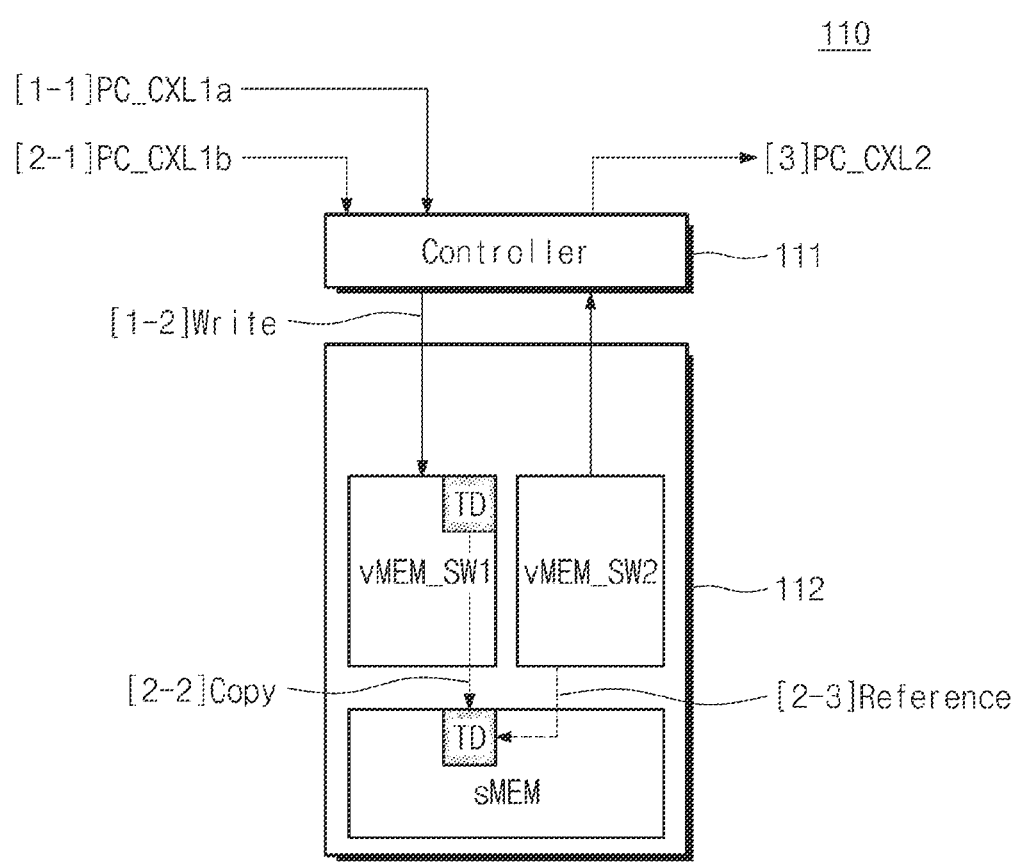

FIGS. 8 to 10 are block diagrams illustrating how a memory expander of FIG. 2 transfers target data. An operation of copying target data will be described with reference to FIG. 8, an operation of referring to target data will be described with reference to FIG. 9, and an operation of sharing target data will be described with reference to FIG. 10. The terms used in the above operations are for better understanding of the present disclosure, and the present disclosure is not limited thereto.

Below, a target data transfer operation will be described with reference to an operation of the memory expander 110, but the present disclosure is not limited thereto. For example, the controller 111 of the memory expander 110 may allow the memory device 112 to perform the target data transfer operation.

First, referring to FIGS. 2 and 8, the memory expander 110 may receive the (1–a)-th CXL communication packet PC_CXL1a ([1-1]). The memory expander 110 may store the target data TD in the first virtual switch memory vMEM_SW1 in response to the (1–a)-th CXL communication packet PC_CXL1a ([1-2]).

The memory expander 110 may receive the (1–b)-th CXL communication packet PC_CXL1b ([2-1]). The memory expander 110 may copy the target data TD stored in the first virtual switch memory vMEM_SW1 to the second virtual switch memory vMEM_SW2 in response to the (1–b)-th CXL communication packet PC_CXL1b ([2-2]).

Afterwards, the memory expander 110 may transmit the second CXL communication packet PC_CXL2 including the target data TD stored in the second virtual switch memory vMEM_SW2 to the second host 102 or the second virtual machine VM2 ([3]).

In an embodiment, the target data store operation [1-1] and [1-2] and the target data transfer operation [2-1] and [2-2] may be performed through one communication packet. This is described with reference to FIG. 5B, and thus, additional description will be omitted to avoid redundancy.

Next, referring to FIGS. 2 and 9, the memory expander 110 may perform operation [1-1] and operation [1-2]. Operation [1-1] and operation [1-2] are similar to those described above, and thus, additional description will be omitted to avoid redundancy. The memory expander 110 may receive the (1–b)-th CXL communication packet PC_CXL1b ([2-1]). The memory expander 110 may perform the reference operation associated with the target data TD stored in the first virtual switch memory vMEM_SW1 in response to the (1–b)-th CXL communication packet PC_CXL1b ([2-2]).

In an embodiment, the reference operation may indicate an operation that is performed in a way to refer to an address, at which the target data TD are stored, without physically copying the target data TD. The reference operation may be performed based on mapping information between stored data and an address where the data are stored. For example, after the reference operation associated with the target data TD is performed, the controller 111 may read the target data TD stored in the first virtual switch memory vMEM_SW1 based on the mapping information. That is, the read operation associated with the target data TD stored in the first virtual switch memory vMEM_SW1 may be performed based on the mapping information.

Afterwards, the memory expander 110 may transmit the second CXL communication packet PC_CXL2 including the target data TD stored in the second virtual switch memory vMEM_SW2 to the second host 102 or the second virtual machine VM2 ([3]).

In an embodiment, in the reference operation, after a reference time passes from a time at which the target data TD stored in the first virtual switch memory vMEM_SW1 are referenced, an operation of copying the target data TD from the first virtual switch memory vMEM_SW1 to the second virtual switch memory vMEM_SW2 may be performed. The reference time may be determined based on information included in the reserved field of the CXL header described with reference to FIG. 7.

Next, referring to FIGS. 2 and 10, the memory expander 110 may perform operation [1-1] and operation [1-2]. Operation [1-1] and operation [1-2] are similar to those described above, and thus, additional description will be omitted to avoid redundancy. The memory expander 110 may receive the (1–b)-th CXL communication packet PC_CXL1b ([2-1]). The memory expander 110 may perform a share operation associated with the target data TD stored in the first virtual switch memory vMEM_SW1 in response to the (1–b)-th CXL communication packet PC_CXL1b ([2-2]).

In an embodiment, the share operation may indicate an operation of transferring the target data TD by using a shared memory sMEM included in the memory expander 110. For example, the memory device 112 of the memory expander 110 may include the first virtual switch memory vMEM_SW1, the second virtual switch memory vMEM_SW2, and the shared memory sMEM. The shared memory sMEM may indicate a memory region that is shared to transfer data between the first virtual switch memory vMEM_SW1 and the second virtual switch memory vMEM_SW2.

The memory expander 110 may copy the target data TD stored in the first virtual switch memory vMEM_SW1 to the shared memory sMEM in response to the (1–b)-th CXL communication packet PC_CXL1b ([2-2]). Afterwards, the memory expander 110 may perform the reference operation associated with the target data TD stored in the shared memory sMEM ([2-3]). The reference operation is similar to that described with reference to FIG. 9 except that a location where the target data TD are stored corresponds to the shared memory sMEM, and thus, additional description will be omitted to avoid redundancy.

In an embodiment, in the share operation, instead of referring to the target data TD stored in the shared memory sMEM, an operation of copying the target data TD from the shared memory sMEM to the second virtual switch memory vMEM_SW2 may be performed.

In an embodiment, in the share operation, after a reference time passes from a time at which the target data TD stored in the shared memory sMEM are referenced, an operation of copying the target data TD from the shared memory sMEM to the second virtual switch memory vMEM_SW2 may be performed. The reference time may be determined based on information included in the reserved field of the CXL header described with reference to FIG. 7.

As described above, the target data transfer operation that is performed within the memory expander 110 may be performed based on various manners. In an embodiment, a way to perform the target data transfer operation may be determined based on a value of the memory operation code MEM Opcode of the CXL header described with reference to FIG. 7.

Figure 11:
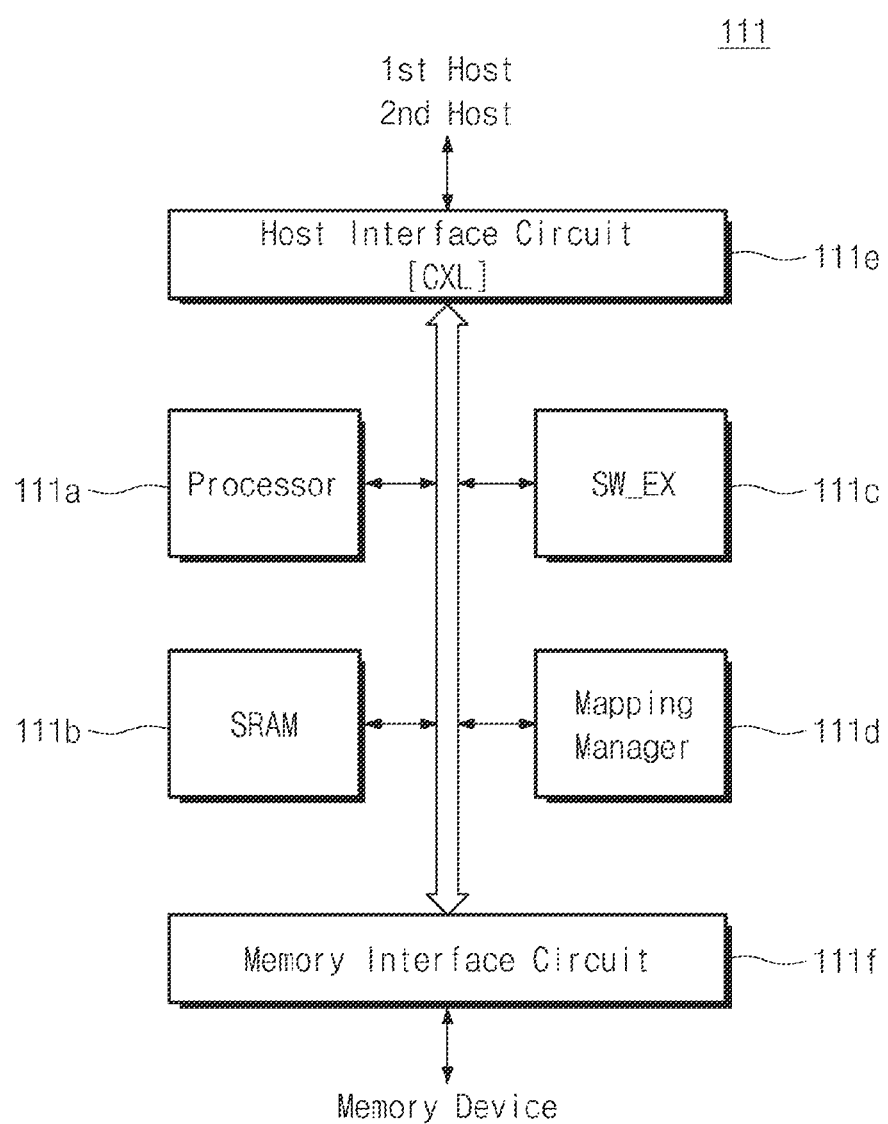
FIG. 11 is a block diagram illustrating a controller included in a memory expander of FIG. 2.

FIG. 11 is a block diagram illustrating a controller included in a memory expander of FIG. 2. Referring to FIGS. 2 and 11, the controller 111 may include a processor 111a, an SRAM 111b, an expansion switch 111c, a mapping manager 111d, a host interface circuit 111e, and a memory interface circuit 111f.

The processor 111a may control overall operations of the controller 111. The SRAM 111b may operate as a buffer memory or a system memory of the controller 111. In an embodiment, the expansion switch 111c and the mapping manager 111d to be described below may be implemented by software, hardware, or a combination thereof. The expansion switch 111c and the mapping manager 111d implemented by software may be stored in the SRAM 111b and may be driven by the processor 111a.

The expansion switch 111c may be configured to generate a packet necessary to perform an internal operation of the memory expander 110. For example, as described with reference to FIG. 6, the expansion switch 111c may generate a communication packet including a custom header and a payload, based on the CXL communication packet received from the outside. The communication packet thus generate may be processed within the controller 111 of the memory expander 110.

The mapping manager 111d may be configured to manage mapping information between data managed by the first and second hosts 101 and 102 and the first and second virtual machines VM1 and VM2 and data stored in the memory device 112. For example, the data managed by the first virtual machine VM1 of the first host 101 may be stored in the first virtual switch memory vMEM_SW1 of the memory device 112. In this case, a memory address of the data managed by the first virtual machine VM1 may be different from an actual address (e.g., a physical address of the memory device 112) of the first virtual switch memory vMEM_SW1. In this case, the mapping manager 111d of the controller 111 may manage mapping information between a memory address of data and a physical address of the first virtual switch memory vMEM_SW1.

Alternatively, as described with reference to FIGS. 8 to 10, in the case where the memory expander 110 transfers the target data TD by performing the reference operation or the share operation, the mapping manager 111d may be configured to manage mapping information between an actual physical address of the target data TD (i.e., a physical address corresponding to the first virtual switch memory vMEM_SW1) and an address of target data recognized as stored in the second virtual switch memory vMEM_SW2. In this case, as described above, in the case where the second virtual machine VM2 requests a read operation associated with the target data TD, the mapping manager 111d of the memory expander 110 may provide the target data TD from the first virtual switch memory vMEM_SW1 to the second virtual machine VM2 based on the mapping information. The reference operation using the shared memory sMEM is also similar to that described above, and thus, additional description will be omitted to avoid redundancy.

In an embodiment, in the case where the memory expander 110 transmits target data through the copy operation and each of the first and second virtual machines VM1 and VM2 manages an actual address (or a physical address) of the memory device 112 as a memory address, the mapping information or the mapping manager 111d may be omitted.

The controller 111 may communicate with the first and second hosts 101 and 102 or the virtual machines VM1 and VM2 respectively included in the first and second hosts 101 and 102, through the host interface circuit 111e. The host interface circuit 111e may be a CXL protocol-based interface circuit. The CXL protocol is described above, and thus, additional description will be omitted to avoid redundancy. The host interface circuit 111e may be configured to support at least one of various heterogeneous computing interfaces, such as a Gen-Z protocol, an NVLink protocol, a CCIX protocol, and an Open CAPI protocol, as well as a heterogeneous computing interface such as the CXL protocol.

The controller 111 may be configured to control the memory device 112 through the memory interface circuit 111f. The memory interface circuit 111f may be configured to support various interfaces depending on kinds of the memory device 112. In an embodiment, the memory interface circuit 111f may be configured to support a memory interface such as a toggle interface or a double data rate (DDR) interface.

Figure 12:
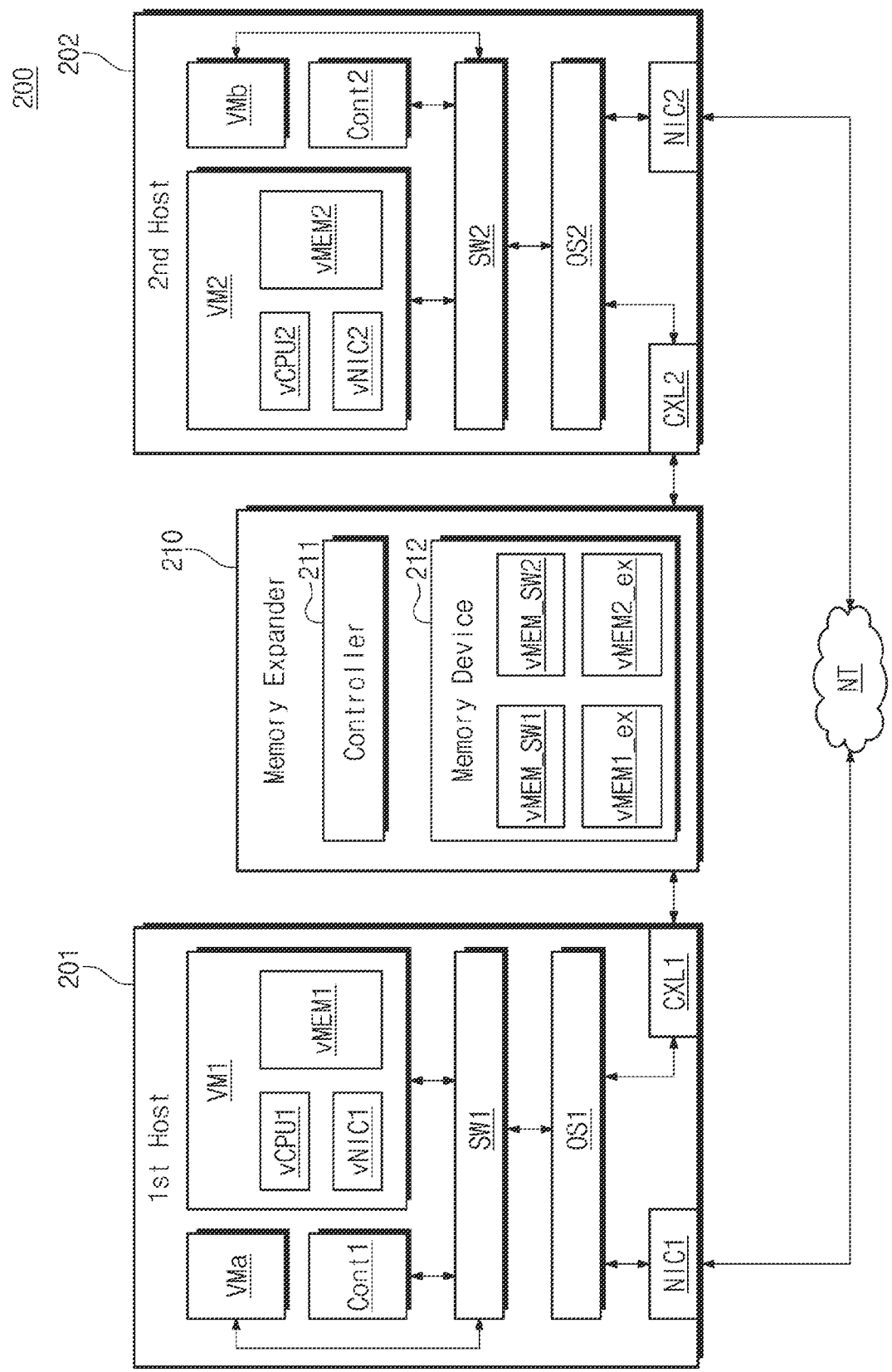
FIG. 12 is a block diagram illustrating a server system according to an embodiment of the present disclosure.
Figure 13:
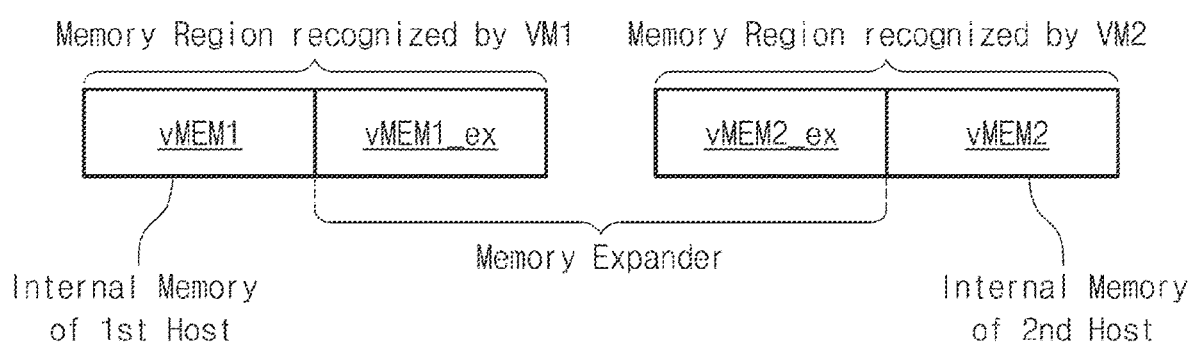
FIG. 13 is a diagram conceptually illustrating memory regions recognized by first and second virtual machines.

FIG. 12 is a block diagram illustrating a server system according to an embodiment of the present disclosure. FIG. 13 is a diagram conceptually illustrating memory regions recognized by first and second virtual machines. For convenience of description, additional description associated with the components described above will be omitted to avoid redundancy.

A server system 200 may include a first host 201, a second host 202, and a memory expander 210. The first and second hosts 201 and 202 may communicate with each other over the network NT.

The first host 201 may include the first operating system OS1, the plurality of virtual machines VM1 and VMa, the container Cont1, the first switch SW1, the first network interface controller NIC1, and the first heterogeneous computing interface controller CXL1. The second host 202 may include the second operating system OS2, the plurality of virtual machines VM2 and VMb, the container Cont2, the second switch SW2, the second network interface controller NIC2, and the second heterogeneous computing interface controller CXL2. The memory expander 210 may include a controller 211 and a memory device 212. The components of FIG. 12 are similarly to those described above, and thus, additional description will be omitted to avoid redundancy.

Unlike the embodiment described with reference to FIG. 2, in the embodiment of FIG. 12, the first virtual machine VM1 may recognize a portion of an internal memory of the first host 201 and a portion of the memory device 212 of the memory expander 210 as a first virtual memory. Also, the second virtual machine VM2 may recognize a portion of an internal memory of the second host 202 and another portion (or the remaining portion) of the memory device 212 of the memory expander 210 as a second virtual memory.

For example, as illustrated in FIGS. 12 and 13, the first virtual machine VM1 may include the first virtual memory vMEM1, and the memory device 212 of the memory expander 210 may include a first expanded virtual memory vMEM1_ex. The first virtual memory vMEM1 may be a memory allocated from the internal memory included in the first host 201, and the first expanded virtual memory vMEM1_ex may be a memory allocated from the memory device 212 included in the memory expander 210 (i.e., an external memory of the first host 201). The first virtual machine VM1 may use the first virtual memory vMEM1 and the first expanded virtual memory vMEM1_ex as a virtual memory. That is, the first virtual machine VM1 may recognize and manage a region of the first virtual memory vMEM1 and a region of the first expanded virtual memory vMEM1_ex as a memory region allocated to the first virtual machine VM1.

Likewise, the second virtual machine VM2 may include the second virtual memory vMEM2, and the memory device 212 of the memory expander 210 may further include a second expanded virtual memory vMEM2_ex. The second virtual memory vMEM2 may be a memory allocated from the internal memory included in the second host 202, and the second expanded virtual memory vMEM2_ex may be a memory allocated from the memory device 212 included in the memory expander 210 (i.e., an external memory of the second host 202). The second virtual machine VM2 may use the second virtual memory vMEM2 and the second expanded virtual memory vMEM2_ex as a virtual memory. That is, the second virtual machine VM2 may recognize and manage a region of the second virtual memory vMEM2 and a region of the second expanded virtual memory vMEM2_ex as a memory region allocated to the second virtual machine VM2.

In an embodiment, the memory device 212 of the memory expander 210 may include the first virtual switch memory vMEM_SW1 and the second virtual switch memory vMEM_SW2. The communication between the first and second virtual machines VM1 and VM2 through the CXL interface and the memory expander 210 is similar to that described above, except that the memory device 212 of the memory expander 210 further includes the first expanded virtual memory vMEM1_ex and the second expanded virtual memory vMEM2_ex, and thus, additional description will be omitted to avoid redundancy.

In an embodiment, the number of virtual switch memories included in the memory expander 210 may correspond to the number of switches included in hosts connected through the memory expander 210 and the CXL interface, and the number of expanded virtual memories included in the memory expander 210 may correspond to the number of virtual machines or containers included in the hosts connected through the memory expander 210 and the CXL interface.

Figure 14A:
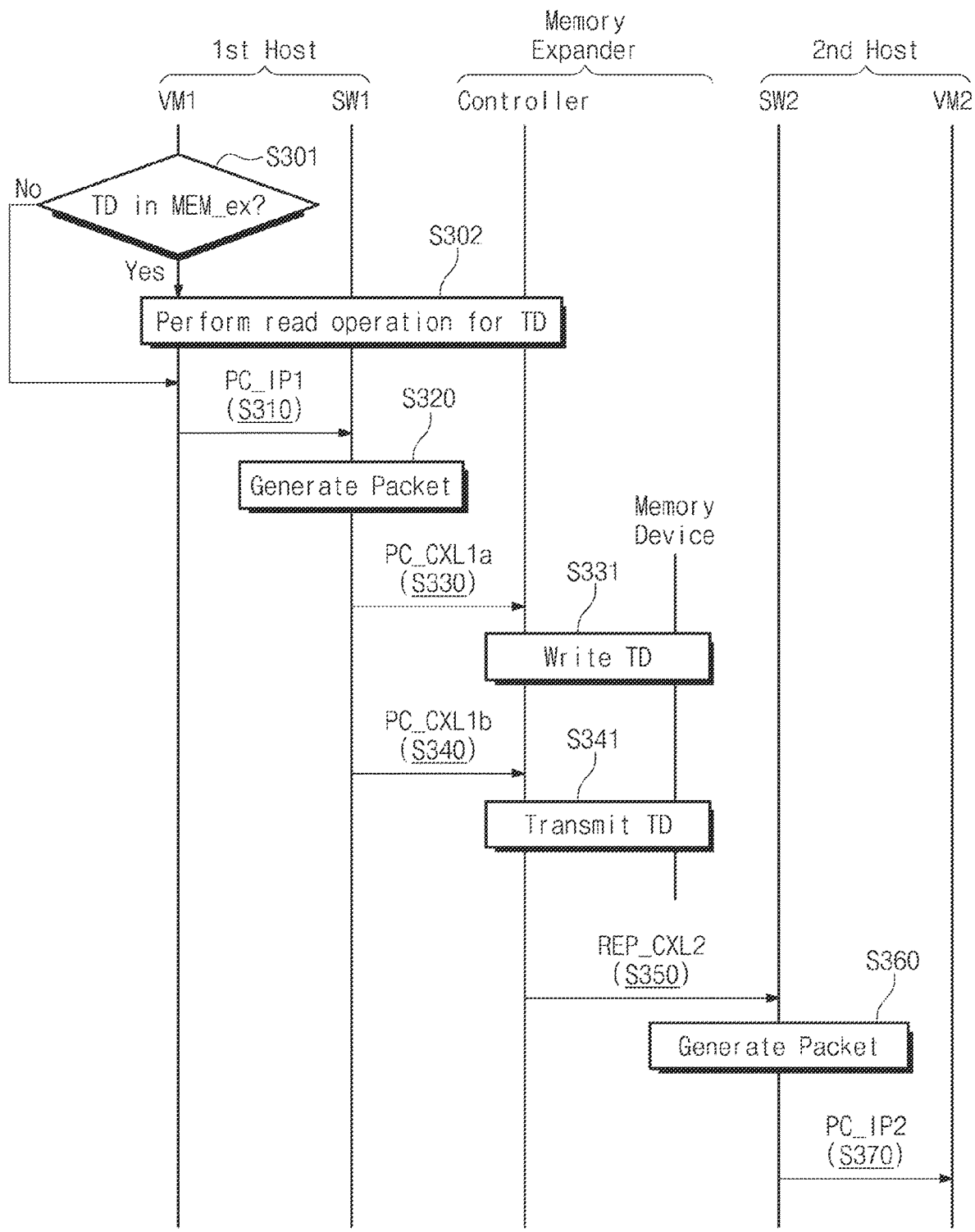
FIGS. 14A and 14B are flowcharts illustrating an operation of a server system of FIG. 12.
Figure 14B:
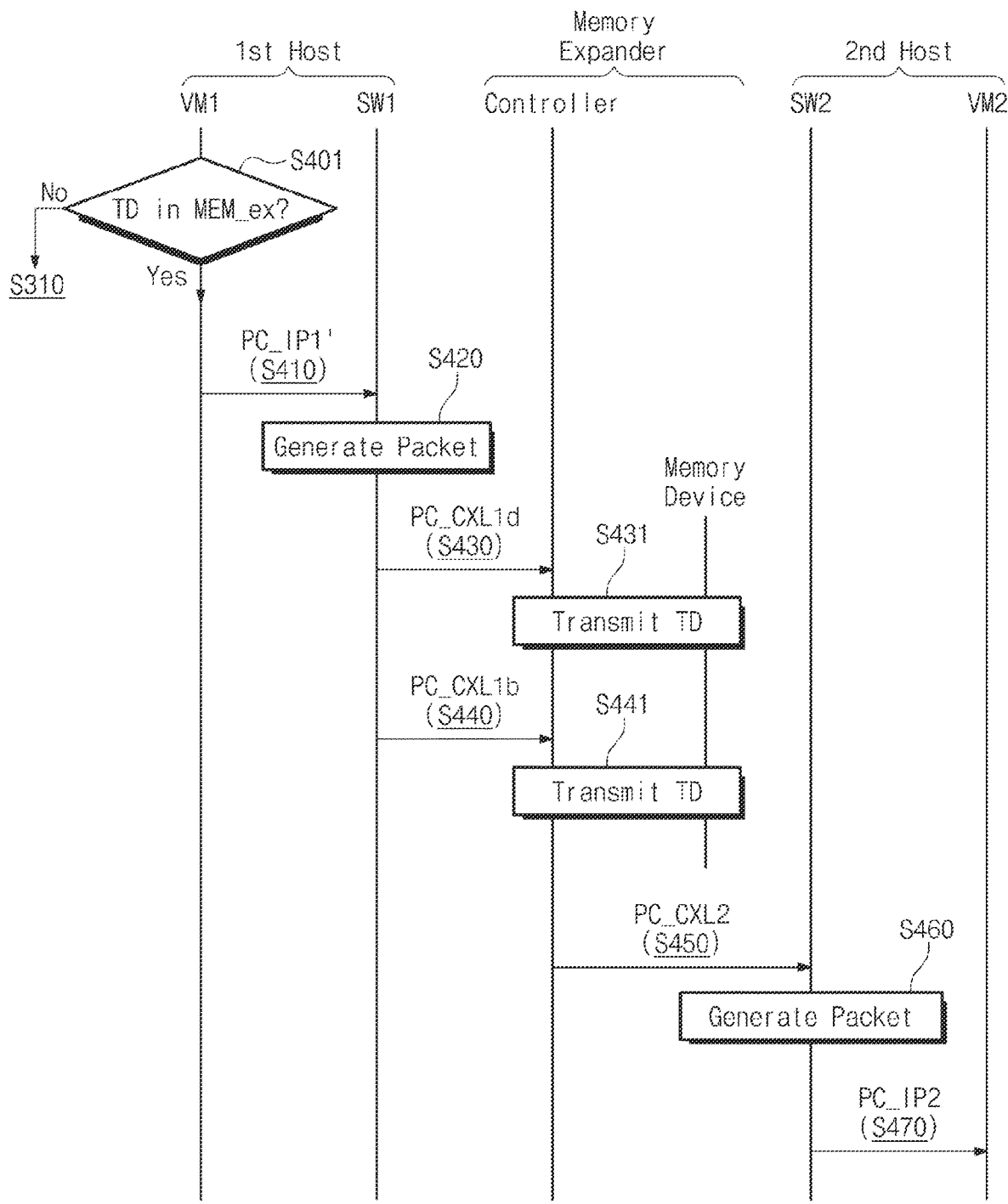

FIGS. 14A and 14B are flowcharts illustrating an operation of a server system of FIG. 12. For convenience of description, additional description associated with the components described above will be omitted to avoid redundancy. Referring to FIGS. 12 and 14A, in operation S301, the first virtual machine VM1 may determine whether the target data TD are present in an expanded memory. For example, as described above, a virtual memory allocated to the first virtual machine VM1 may include the first virtual memory vMEM1 and the first expanded virtual memory vMEM1_ex. The first virtual machine VM1 may determine whether the target data TD are present in the first virtual memory vMEM1 or are present in the first expanded virtual memory vMEM1_ex.

When the target data TD are present in the first expanded virtual memory vMEM1_ex, in operation S302, the first virtual machine VM1 may perform a read operation associated with the target data TD. For example, the first virtual machine VM1 may read the target data TD stored in the first expanded virtual memory vMEM1_ex of the memory expander 210 through the CXL interface. In an embodiment, the read operation may be performed in a CXL protocol-based manner.

After the read operation in operation S302 is completed or when the target data TD are present in the first virtual memory vMEM1 (i.e., an internal memory of the first host 201), in operation S310, the first virtual machine VM1 may generate the first IP communication packet PC_IP1 including the target data TD. Afterwards, the first switch SW1, the controller 211 and the memory device 212 of the memory expander 210, the second switch SW2, and the second virtual machine VM2 may perform operation S320 to operation S370. Operation S320 to operation S370 are similar to operation S210 to operation S270 of FIG. 5A, and thus, additional description will be omitted to avoid redundancy. In an embodiment, as in the description given with reference to FIGS. 5A and 5B, operation S330 to operation S341, that is, a target data storing operation and a target data transfer operation may be integrated to one operation based on a communication packet such as an M2S RwD message.

Next, referring to FIGS. 12 and 14B, in operation S401, the first virtual machine VM1 may determine the target data TD are present in an expanded memory. When the target data TD are present in the first virtual memory vMEM1 (i.e., an internal memory of the first host 201), the first virtual machine VM1 may perform operation S310 described with reference to FIG. 14A, and the following operations of the first virtual machine VM1, the first switch SW1, the controller 211 and the memory device 212 of the memory expander 210, the second switch SW2, and the second virtual machine VM2 may be similar to those described with reference to FIG. 14A.

Unlike the description given with reference to FIG. 14A, when the target data TD are present in the first expanded virtual memory vMEM1_ex, a target data transfer operation may be performed without the read operation associated with the memory expander 210. For example, when the target data TD are present in the first expanded virtual memory vMEM1_ex, in operation S410, the first virtual machine VM1 may generate a first IP communication packet PC_IP1'. Unlike the description given with reference to FIG. 14A, the first IP communication packet PC_IP1' may not include the target data TD.

In operation S420, the first switch SW1 may generate the first CXL communication packet PC_CXL1 based on the first IP communication packet PC_IP1'.

In operation S430, the first switch SW1 may transmit a (1–d)-th CXL communication packet PC_CXL1*d* to the memory expander 210. The controller 211 of the memory expander 210 may perform a first transfer operation S431 associated with the target data TD in response to the the (1–d)-th CXL communication packet PC_CXL1*d*.

In operation S440, the first switch SW1 may transmit the (1–b)-th CXL communication packet PC_CXL1*b* to the memory expander 210. The controller 211 of the memory expander 210 may perform a second transfer operation S441 associated with the target data TD in response to the (1–b)-th CXL communication packet PC_CXL1b.

Afterwards, the controller 211 of the memory expander 210, the second switch SW2 of the second host 102, and the second virtual machine VM2 may perform operation S450 to operation S470. Operation S450 to operation S470 are similar to those described with reference to FIG. 5A, and thus, additional description will be omitted to avoid redundancy.

In an embodiment, the first transfer operation in operation S431 may indicate an operation for transferring the target data TD from the first expanded virtual memory vMEM Lex to the first virtual switch memory vMEM_SW1, and the second transfer operation in operation S441 may indicate an operation for transferring the target data TD from the first virtual switch memory vMEM_SW1 to the second virtual switch memory vMEM_SW2. In an embodiment, each of the first transfer operation and the second transfer operation may be performed based on at least one of the copy operation, the reference operation, or the share operation described above or a combination thereof. In an embodiment, the first transfer operation and the second transfer operation may be performed in response to one CXL communication packet.

Figure 15:
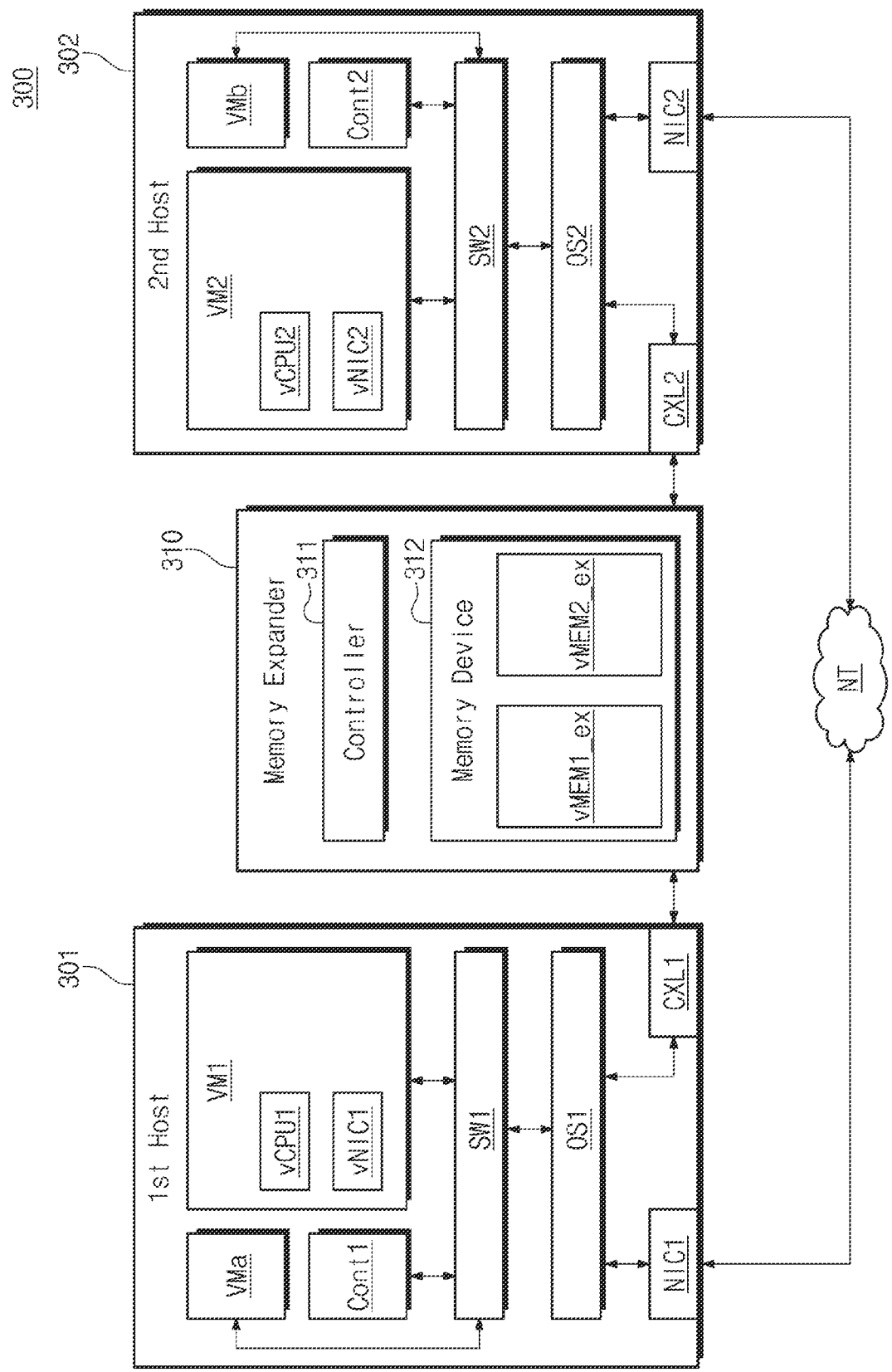
FIG. 15 is a block diagram illustrating a server system according to an embodiment of the present disclosure.
Figure 16:
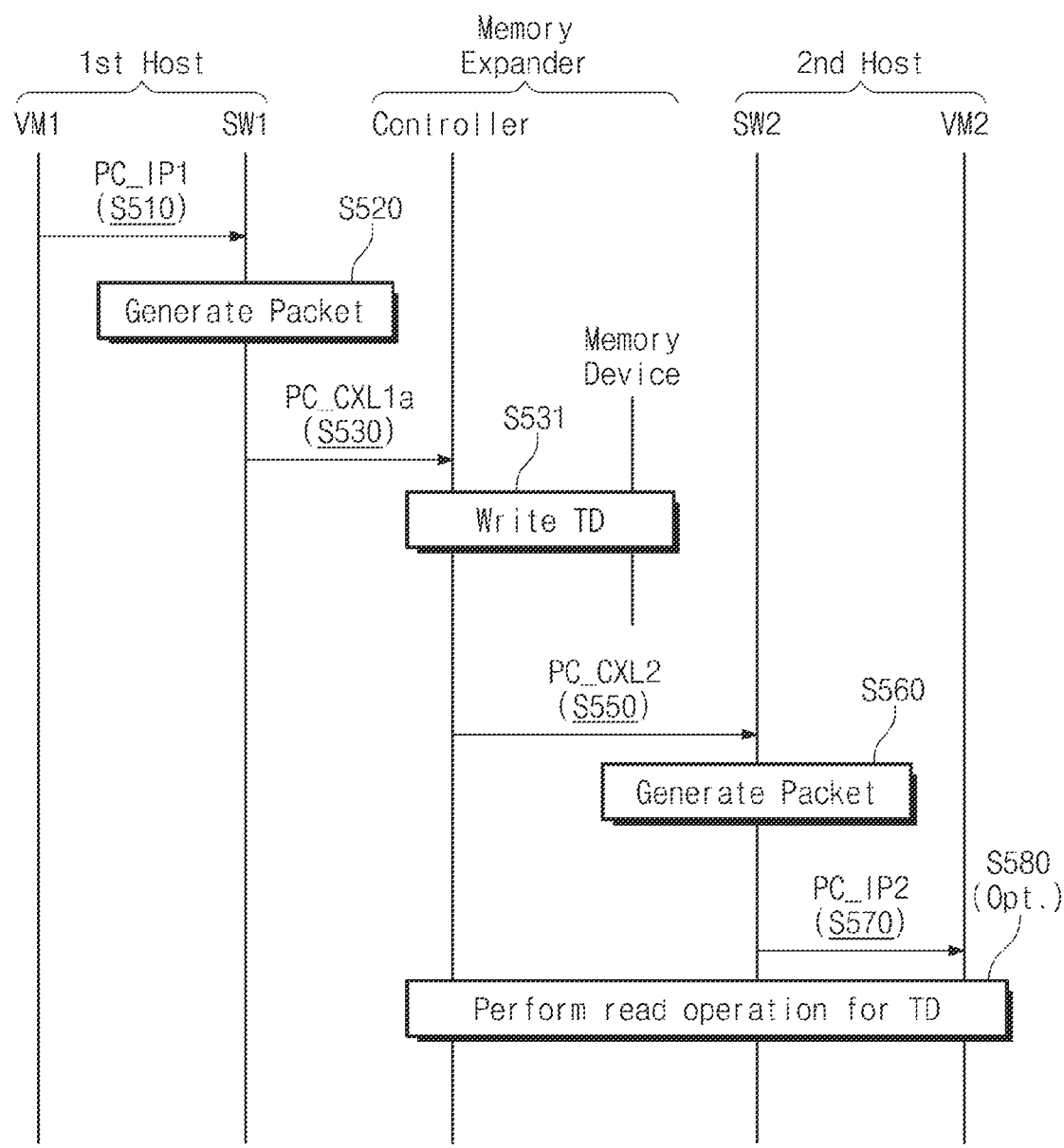
FIG. 16 is a flowchart illustrating an operation of a server system of FIG. 15.

FIG. 15 is a block diagram illustrating a server system according to an embodiment of the present disclosure. FIG. 16 is a flowchart illustrating an operation of a server system of FIG. 15. Referring to FIGS. 15 and 16, a server system 300 may include a first host 301, a second host 302, and a memory expander 310. The first and second hosts 301 and 302 may communicate with each other over the network NT.

The first host 301 may include the first operating system OS1, the plurality of virtual machines VM1 and VMa, the container Cont1, the first switch SW1, the first network interface controller NIC1, and the first heterogeneous computing interface controller CXL1. The second host 302 may include the second operating system OS2, the plurality of virtual machines VM2 and VMb, the container Cont2, the second switch SW2, the second network interface controller NIC2, and the second heterogeneous computing interface controller CXL2. The memory expander 310 may include a controller 311 and a memory device 312. The components of FIG. 15 are similar to those described above, and thus, additional description will be omitted to avoid redundancy.

In an embodiment, unlike the above description, the first virtual machine VM1 may not include a virtual memory allocated from an internal memory of the first host 301 and the second virtual machine VM2 may not include a virtual memory allocated from an internal memory of the second host 302. A virtual memory for the first virtual machine VM1 may be provided as the first expanded virtual memory vMEM1_ex using the memory device 312 of the memory expander 310, and a virtual memory for the second virtual machine VM2 may be provided as the second expanded virtual memory vMEM2_ex using the memory device 312 of the memory expander 310. That is, the first virtual machine VM1 may use a partial memory region of the memory device 312 of the memory expander 310, which is an external memory of the first host 301, as a virtual memory, and the second virtual machine VM2 may use a partial memory region of the memory device 312 of the memory expander 310, which is an external memory of the second host 302, as a virtual memory.

In an embodiment, data that are maintained or managed by the first virtual machine VM1 may be stored only in the first expanded virtual memory vMEM1_ex of the memory expander 310, and data that are maintained or managed by the second virtual machine VM2 may be stored only in the second expanded virtual memory vMEM2_ex of the memory expander 310.

In an embodiment, as in the above description, the target data TD may be transmitted from the first virtual machine VM1 to the second virtual machine VM2 through the CXL interface and the memory expander 310.

For example, as illustrated in FIG. 16, in operation S510, the first virtual machine VM1 may generate the first IP communication packet PC_IP1. In an embodiment, unlike the description given with reference to FIGS. 1 to 14, the first IP communication packet PC_IP1 may not include the target data TD. The first IP communication packet PC_IP1 may be a request for transmitting the target data TD to the second virtual machine VM2.

In operation S520, the first switch SW1 may generate the first CXL communication packet PC_CXL1 based on the first IP communication packet PC_IP1. In operation S530, the first switch SW1 may transmit the (1–a)-th CXL communication packet PC_CXL1a to the controller 311 of the memory expander 310. In operation S531, the controller 311 of the memory expander 310 may perform a transfer operation associated with the target data TD. For example, the memory expander 310 may perform the copy operation, the reference operation, or the share operation for the purpose of transferring the target data TD from the first expanded virtual memory vMEM1_ex to the second expanded virtual memory vMEM2_ex.

In operation S550, the controller 311 of the memory expander 310 may transmit the second CXL communication packet PC_CXL2 to the second switch SW2. The second switch SW2 may generate, in operation S560, the second IP communication packet PC_IP2 based on the second CXL communication packet PC_CXL2 and communicate, in operation S570, the second CXL communication packet PC_CXL2 to the second virtual machine VM2. In an embodiment, the second CXL communication packet PC_CXL2 or the second IP communication packet PC_IP2 may include information providing notification that the target data TD are stored in the second expanded virtual memory vMEM2_ex. In this case, in operation S580, the second virtual machine VM2 may perform a read operation for reading the target data TD stored in the second expanded virtual memory vMEM2_ex, in response to the second IP communication packet PC_IP2. In an embodiment, the read operation may be performed in a manner defined by the CXL protocol.

In an embodiment, the second CXL communication packet PC_CXL2 may include the target data TD. In this case, the second virtual machine VM2 may recognize the target data TD through the second IP communication packet PC_IP2, and operation S580 may be omitted.

Figure 17:
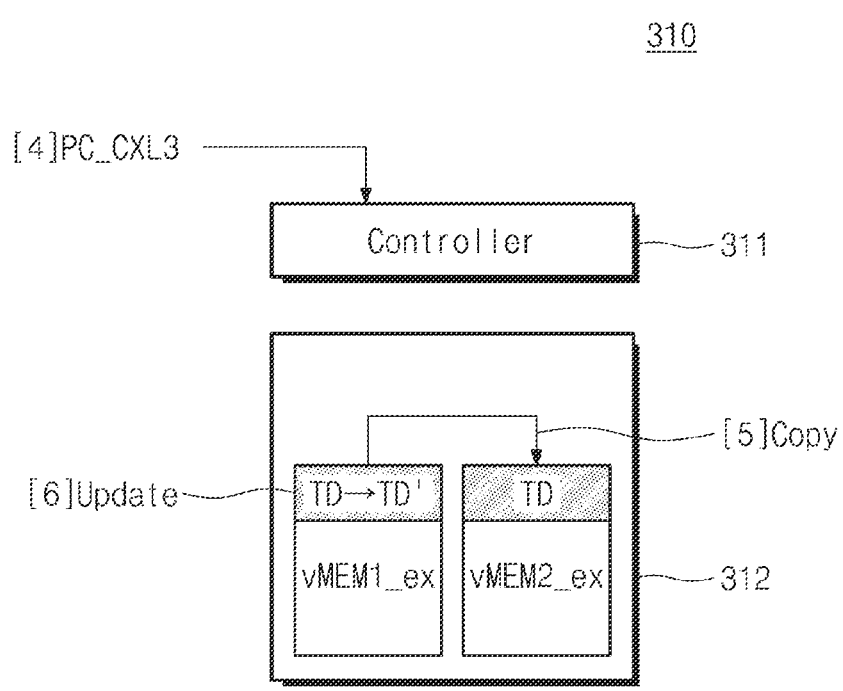
FIG. 17 is a diagram for describing a target data update operation of a memory expander of FIG. 15.

FIG. 17 is a diagram for describing a target data update operation of a memory expander of FIG. 15. In an embodiment, the memory expander 310 may perform the reference operation associated with the target data TD. The reference operation is similar to that described with reference to FIG. 9 except that the reference operation is performed between the first expanded virtual memory vMEM1_ex and the second expanded virtual memory vMEM2_ex, and thus, additional description will be omitted to avoid redundancy.

In the case where the target data TD stored in the first expanded virtual memory vMEM1_ex are updated by the first virtual machine VM1, because data are actually stored in the first expanded virtual memory vMEM1_ex, the second expanded virtual memory vMEM2_ex may fail to refer to original target data TD.

In this case, to update the target data TD which the second expanded virtual memory vMEM2_ex will make reference to, the memory expander 310 may copy the target data TD to the second expanded virtual memory vMEM2_ex and may then update the target data TD. For example, as shown in FIG. 17, the memory expander 310 may receive a third CXL communication packet PC_CXL3 ([4]). The third CXL communication packet PC_CXL3 may indicate a request corresponding to an update of the target data TD.

In response to the third CXL communication packet PC_CXL3, the memory expander 310 may first copy the target data TD to the second expanded virtual memory vMEM2_ex before updating the target data TD ([5]). In an embodiment, the copy operation associated with the target data TD may be performed based on mapping information that is managed by a mapping manager of the controller 311.

After the target data TD are completely copied, the memory expander 310 may update the target data TD with updated target data TD' ([6]).

As described above, in the case where an update associated with the target data TD to be referenced through the reference operation is requested, the memory expander 310 may copy the target data TD to a memory region (e.g., vMEM2_ex) linked to the target data TD before updating the target data TD, and may then update the target data TD after the copy operation is completed. In this case, an issue in which the second virtual machine VM2 fails to read original target data TD due to the update of the target data TD may be prevented.

Figure 18:
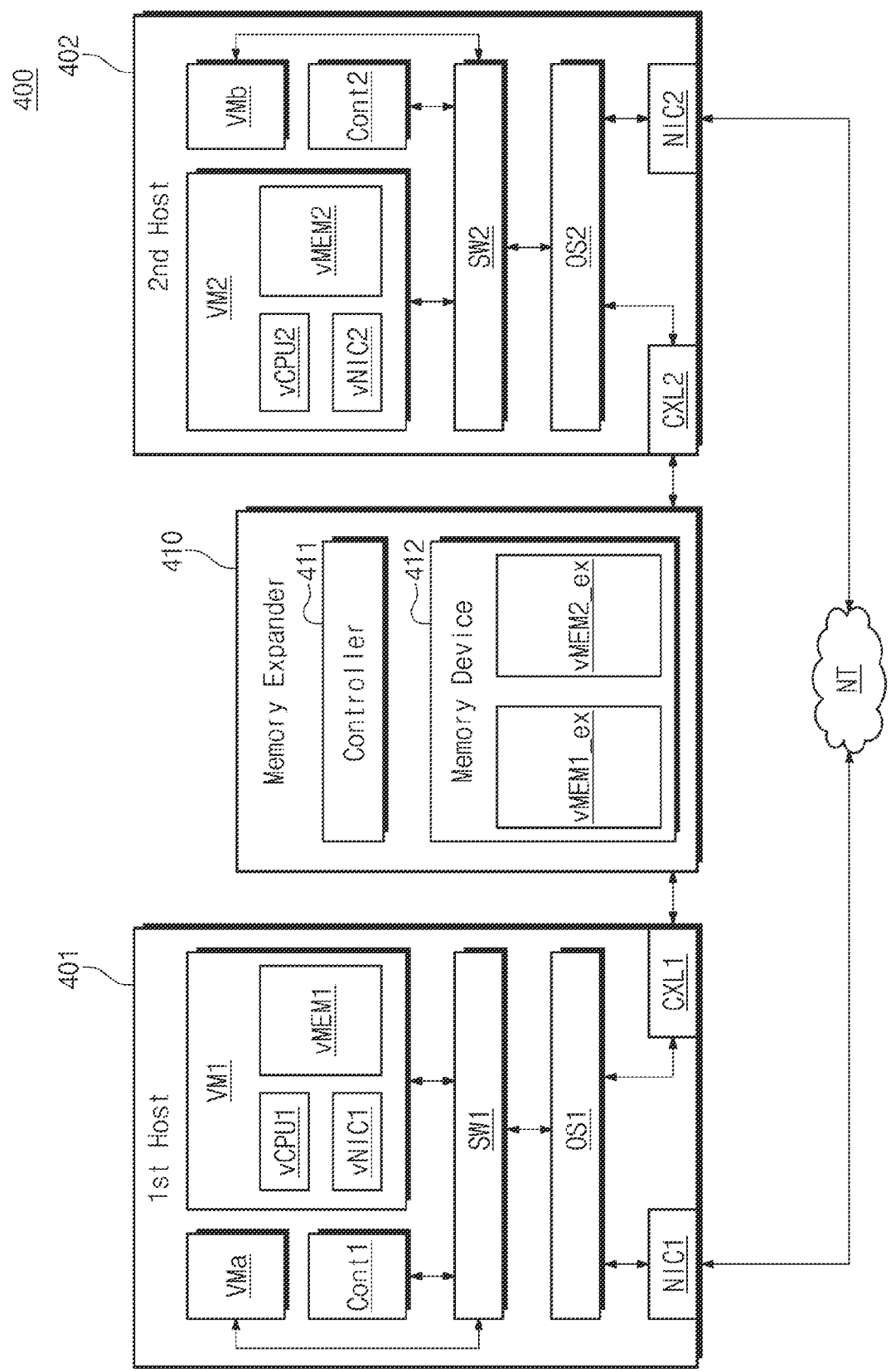
FIG. 18 is a block diagram illustrating a server system according to an embodiment of the present disclosure.
Figure 19:
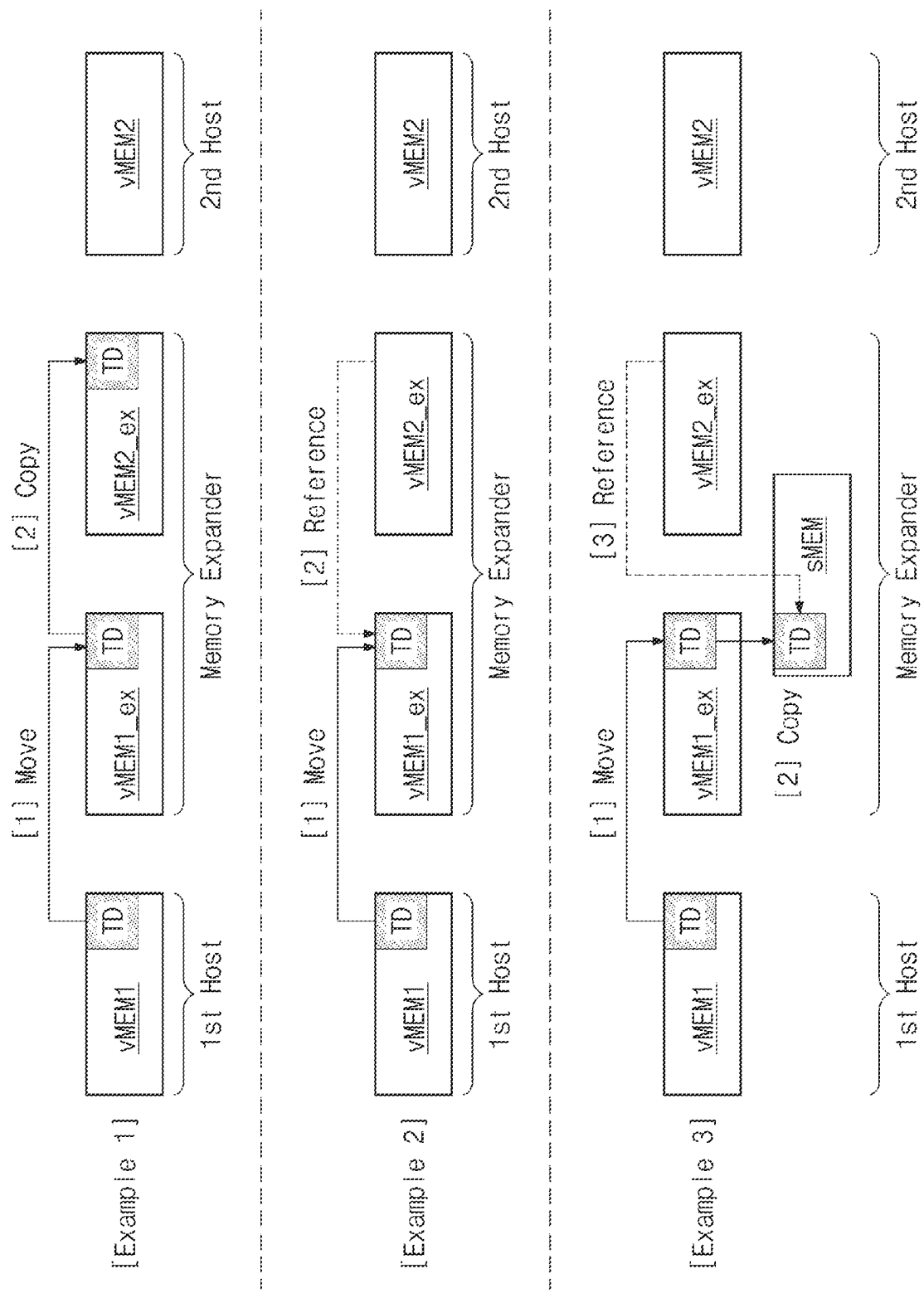
FIG. 19 is a diagram for describing operations of a memory expander of FIG. 18.

FIG. 18 is a block diagram illustrating a server system according to an embodiment of the present disclosure. FIG. 19 is a diagram for describing operations of a memory expander of FIG. 18. Referring to FIGS. 18 and 19, a server system 400 may include a first host 401, a second host 402, and a memory expander 410. The first and second hosts 401 and 402 may communicate with each other over the network NT.

The first host 401 may include the first operating system OS1, the plurality of virtual machines VM1 and VMa, the container Cont1, the first switch SW1, the first network interface controller NIC1, and the first heterogeneous computing interface controller CXL1. The second host 402 may include the second operating system OS2, the plurality of virtual machines VM2 and VMb, the container Cont2, the second switch SW2, the second network interface controller NIC2, and the second heterogeneous computing interface controller CXL2. The memory expander 410 may include a controller 411 and a memory device 412. In the embodiment of FIG. 18, the components of FIG. 18 are similar to those described above except that the memory expander 410 does not include the first and second virtual switch memories vMEM_SW1 and vMEM_SW2, and thus, additional description will be omitted to avoid redundancy.

In an embodiment, as described above, the communication between the first and second virtual machines VM1 and VM2 may be performed through the CXL interface and the memory expander 410. In this case, the memory expander 410 may copy or transmit the target data TD depending on a location of the target data TD.

For example, in the case where the target data TD are included in the first expanded virtual memory vMEM1_ex of the memory expander 410, the components of the server system 400 may transfer the target data TD from the first virtual machine VM1 to the second virtual machine VM2 based on the manner described with reference to FIGS. 15 to 17.

In the case where the target data TD are stored in an internal memory (i.e., the first virtual memory vMEM1) of the first host 401, the target data TD may be moved from the first virtual memory vMEM1 to the first expanded virtual memory vMEM1_ex, and then, a target data transfer operation may be performed.

For example, as illustrated in FIG. 19, in a first example, after a move operation associated with the target data TD is performed ([1]), the memory expander 210 may copy the target data TD from a first expanded virtual memory vMEM1_ex to a second expanded virtual memory vMEM2_ex ([2]). The copy operation associated with the target data TD is similar to that described with reference to FIG. 8 except that memory regions are different, and thus, additional description will be omitted to avoid redundancy.

In a second example, after a move operation associated with the target data TD is performed ([1]), the memory expander 210 may perform the reference operation without physically copying the target data TD ([2]). The reference operation associated with the target data TD is similar to that described with reference to FIG. 9 except that memory regions are different, and thus, additional description will be omitted to avoid redundancy.

In a third example, after a move operation associated with the target data TD is performed ([1]), the memory expander 210 may copy the target data TD from the first expanded virtual memory vMEM1_ex to the shared memory sMEM ([2]). Afterwards, the memory expander 210 may perform the reference operation associated with the target data TD stored in the shared memory sMEM ([3]). The reference operation using the shared memory sMEM is similar to that described with reference to FIG. 10 except that memory regions are different, and thus, additional description will be omitted to avoid redundancy.

In an embodiment, after a target data transfer operation is completed as described with reference to the above examples, the second virtual machine VM2 may perform a read operation associated with the target data TD and may move the target data TD, which are stored in the memory expander 210 or are referenced at the memory expander 210, to an internal memory of the second host 202 (i.e., the second expanded virtual memory).

As described above, the target data transfer operation may be performed based in various manners. The above ways to transmit target data are some examples, and the present disclosure is not limited thereto.

Figure 20:
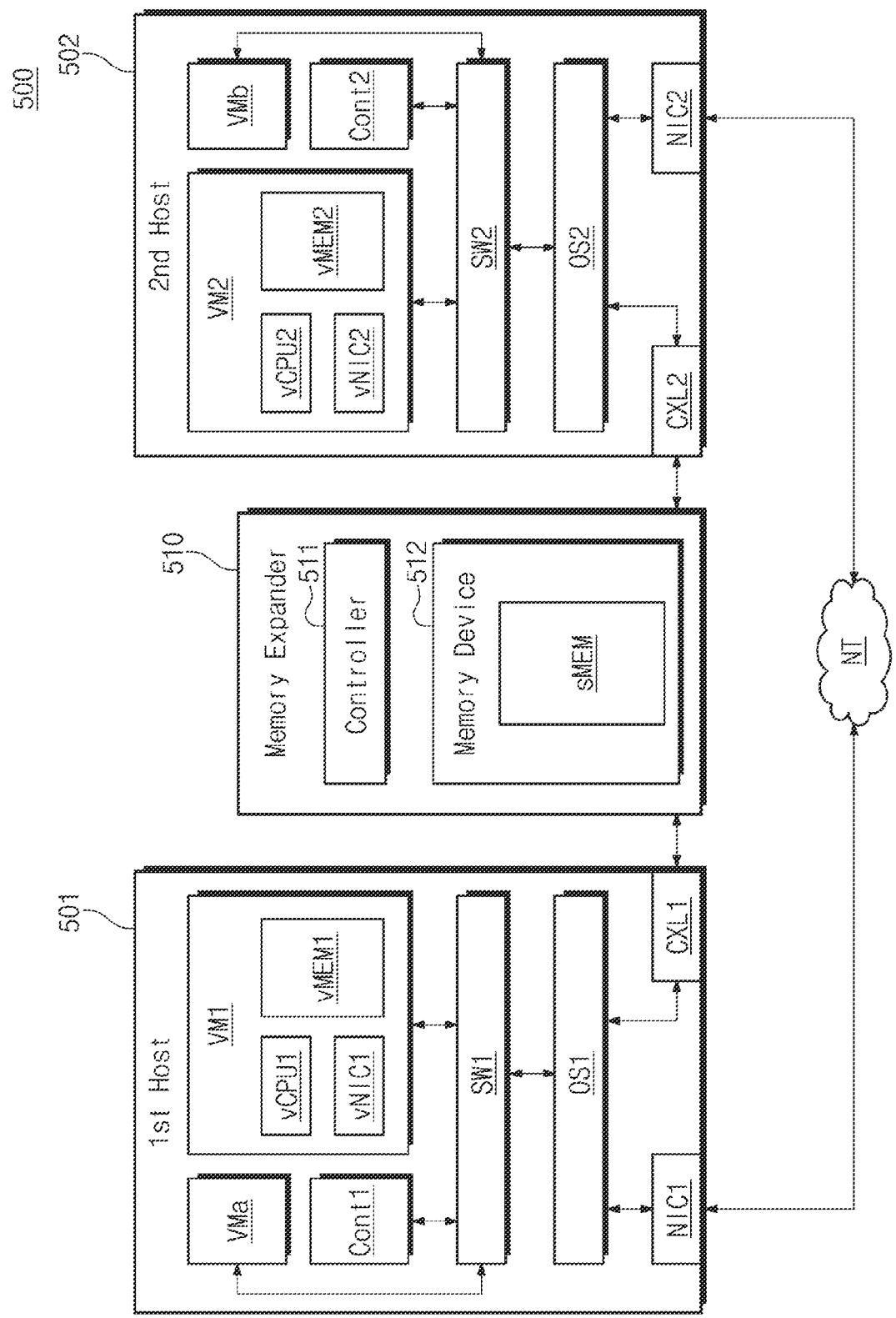
FIG. 20 is a block diagram illustrating a server system according to an embodiment of the present disclosure.
Figure 21:
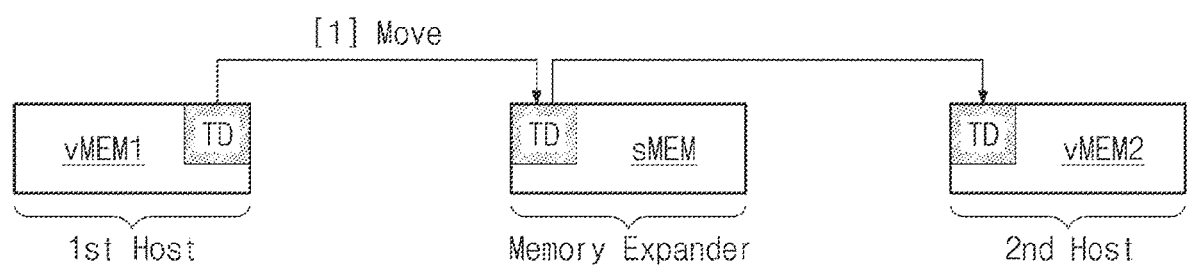
FIG. 21 is a diagram for describing an operation of a memory expander of FIG. 20.

FIG. 20 is a block diagram illustrating a server system according to an embodiment of the present disclosure. FIG. 21 is a diagram for describing an operation of a memory expander of FIG. 20. Referring to FIGS. 20 and 21, a server system 500 may include a first host 501, a second host 502, and a memory expander 510. The first host 501 and the second host 502 may communicate with each other through the network NT. The memory expander 510 may communicate with the first host 501 and the second host 502 through the CXL interfaces, respectively.

The first host 501 may include the first operating system OS1, the plurality of virtual machines VM1 and VMa, the container Cont1, the first switch SW1, the first network interface controller NIC1, and the first heterogeneous computing interface controller CXL1. The second host 502 may include the second operating system OS2, the plurality of virtual machines VM2 and VMb, the container Cont2, the second switch SW2, the second network interface controller NIC2, and the second heterogeneous computing interface controller CXL2. The memory expander 510 may include a controller 511 and a memory device 512. The components of FIG. 20 are similarly to those described above, and thus, additional description will be omitted to avoid redundancy.

Unlike the above embodiments, in the embodiment of FIG. 20, the memory expander 510 may not include a memory region associated with a first virtual memory, a second virtual memory, a first virtual switch memory, and a second virtual switch memory. For example, the first virtual memory vMEM1 that is used by the first virtual machine VM1 may be only present in the first host 501. In other words, the first virtual machine VM1 may use a portion of an internal memory of the first host 501 as the first virtual memory vMEM1. That is, data that are managed by the first virtual machine VM1 may be stored only in the internal memory of the first host 501.

The second virtual memory vMEM2 that is used by the second virtual machine VM2 may be only present in the second host 502. In other words, the second virtual machine VM2 may use a portion of an internal memory of the second host 502 as the second virtual memory vMEM2. That is, data that are managed by the second virtual machine VM2 may be stored only in the internal memory of the second host 502.

In an embodiment, the first virtual machine VM1 and the second virtual machine VM2 of FIG. 20 may perform communication based on a manner similar to that of the above embodiments. That is, the first virtual machine VM1 and the second virtual machine VM2 may exchange data through the CXL interface and the memory expander 510. In this case, the memory device 512 of the memory expander 510 may not include a memory region associated with a first virtual memory and a second virtual memory and may only include the shared memory sMEM.

In this case, an operation of transmitting the target data TD from the first virtual machine VM1 to the second virtual machine VM2 may be performed as illustrated in FIG. 21. For example, the target data TD of the first virtual machine VM1 may be copied to the shared memory sMEM of the memory expander 510 from the first virtual memory vMEM1 ([1]), and the target data TD copied to the shared memory sMEM may be directly copied from the shared memory sMEM to the second virtual memory vMEM2 through the CXL interface. The second virtual machine VM2 may check the target data TD copied to the second virtual memory vMEM2.

According to embodiments of the present disclosure, virtual machines that are driven on different operating systems or different hosts may communicate with each other through a heterogeneous computing interface (e.g., the CXL interface) and a memory expander, instead of a network supporting the communication between hosts. Accordingly, the communication between the virtual machines may be accelerated.

Figure 22:
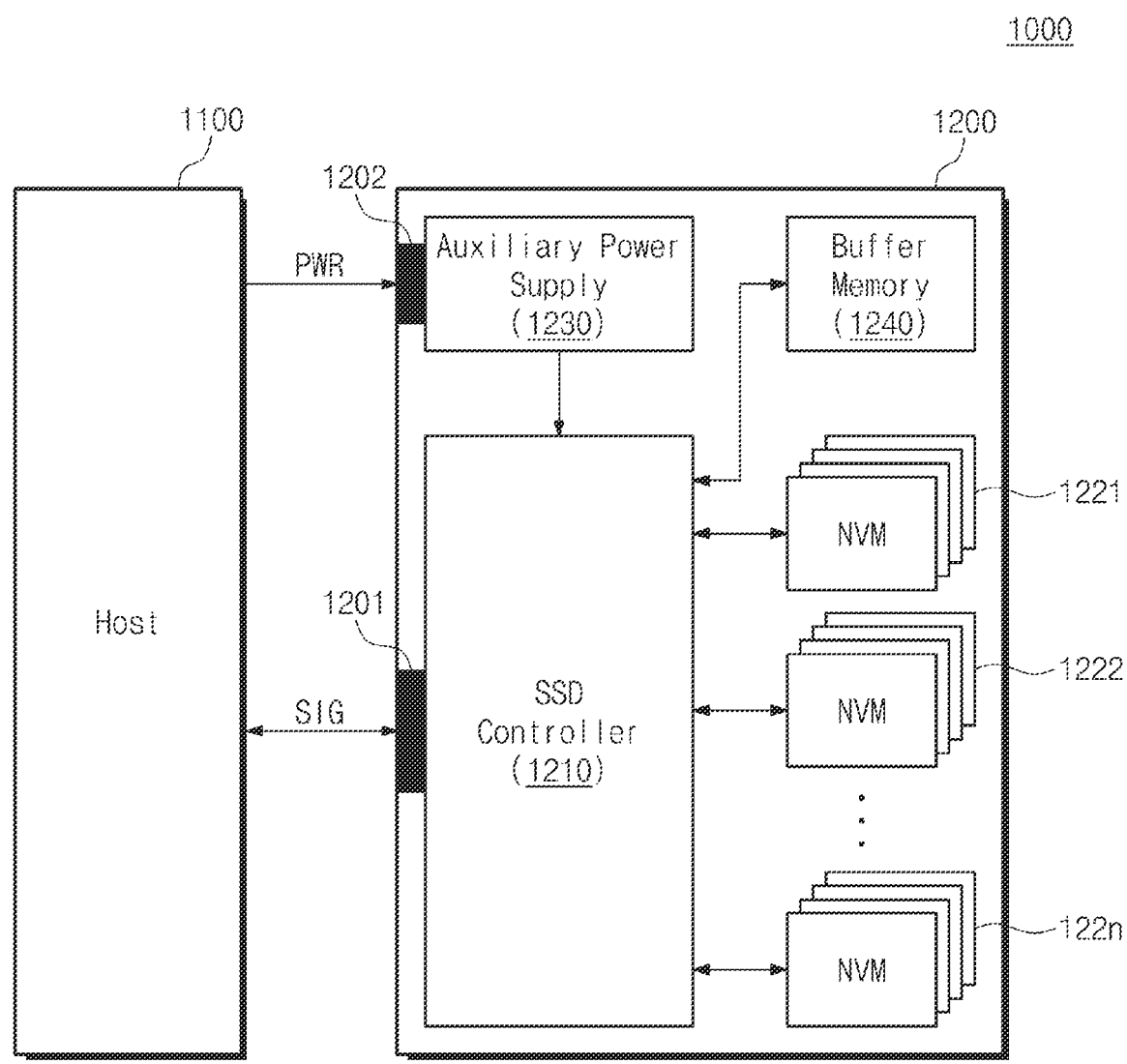
FIG. 22 is a block diagram illustrating an SSD system applicable to a memory expander according to the present disclosure.

FIG. 22 is a block diagram illustrating a solid state drive (SSD) system applicable to a memory expander according to the present disclosure. Referring to FIG. 22, an SSD system 1000 may include a host 1100 and a storage device 1200. The storage device 1200 may exchange signals SIG with the host 1100 through a signal connector 1201 and may be supplied with a power PWR through a power connector 1202. The storage device 1200 includes an SSD controller 1210, a plurality of nonvolatile memories 1221 to 122n, an auxiliary power supply 1230, and a buffer memory 1240.

The SSD controller 1210 may control the plurality of nonvolatile memories 1221 to 122n in response to the signals SIG received from the host 1100. The plurality of nonvolatile memories 1221 to 122n may operate under control of the SSD controller 1210. The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the storage device 1200. The buffer memory 1240 may be used as a buffer memory of the storage device 1200.

In an embodiment, the host 1100 may be one of hosts described with reference to FIGS. 1 to 21, and the host 1100 may be configured to drive various virtual machines or various containers.

In an embodiment, the storage device 1200 may be a memory expander described with reference to FIGS. 1 to 21. The host 1100 and the storage device 1200 may communicate with each other through the CXL interfaces and may operate depending on the embodiments described with reference to FIGS. 1 to 21.

Figure 23:
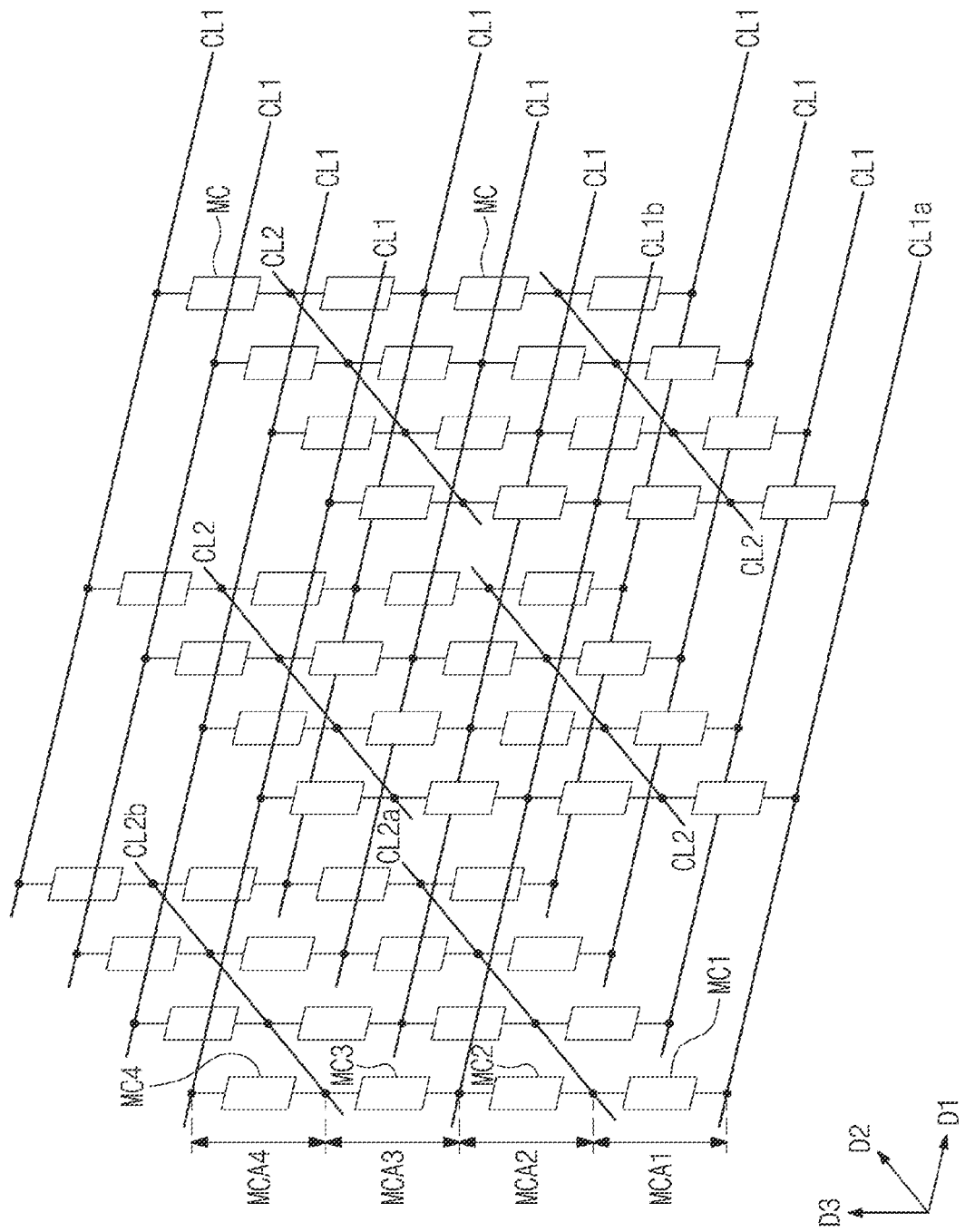
FIG. 23 is a circuit diagram illustrating a three-dimensional structure of a memory device included in a memory expander according to an embodiment of the present disclosure.

FIG. 23 is a circuit diagram illustrating a three-dimensional structure of a memory device included in a memory expander according to an embodiment of the present disclosure. In an embodiment, a memory device may be implemented based on various memories. A configuration of a memory device based on a specific memory structure will be described with reference to FIG. 23, but the present disclosure is not limited thereto. For example, a memory device may be implemented based on at least one of various memories.

Referring to FIG. 23, a memory device may be implemented in a three-dimensional stacked structure. For example, the memory device includes first to fourth memory cell array layers MCA1 to MCA4. The first to fourth memory cell array layers MCA1 to MCA4 may include a plurality of memory cells MC1, MC2, MC3, and MC4, respectively.

The first to fourth memory cell array layers MCA1 to MCA4 may be stacked in a third direction D3, and conductive lines CL1 and CL2 extending in a first direction D1 and a second direction D2 may be alternately formed between the first to fourth memory cell array layers MCA1 to MCA4. For example, the first conductive lines CL1 may extend in the first direction D1, and the second conductive lines CL2 may extend in the second direction D2. The first memory cell array layer MCA1 may be formed above the first conductive lines CL1, and the second conductive lines CL2 may be formed between the first and second memory cell array layers MCA1 and MCA2. The first conductive lines CL1 may be formed between the second and third memory cell array layers MCA2 and MCA3, and the second conductive lines CL2 may be formed between the third and fourth memory cell array layers MCA3 and MCA4. The first conductive lines CL1 may be formed above the fourth memory cell array layer MCA4. The first and second conductive lines CL1 and CL2 may be electrically connected with memory cells adjacent in the third direction D3.

In an embodiment, a target bit line and a target word line may be determined depending on a location of a target memory cell MC. For example, in the case where a first memory cell MC1 of the first memory cell array layer MCA1 is a target memory cell MC, conductive lines CL1a and CL2a may be selected as target lines. In the case where a second memory cell MC2 of the second memory cell array layer MCA2 is a target memory cell MC, conductive lines CL2a and CL1b may be selected as target lines. In the case where a third memory cell MC3 of the third memory cell array layer MCA3 is a target memory cell MC, conductive lines CL1b and CL2b may be selected as target lines. That is, target lines may be selected depending on a location of a target memory cell MC, and the selected target lines may be used as a bit line and a word line or as a word line and a bit line depending on a location of the target memory cell MC. However, the present disclosure is not limited thereto.

Figure 24:
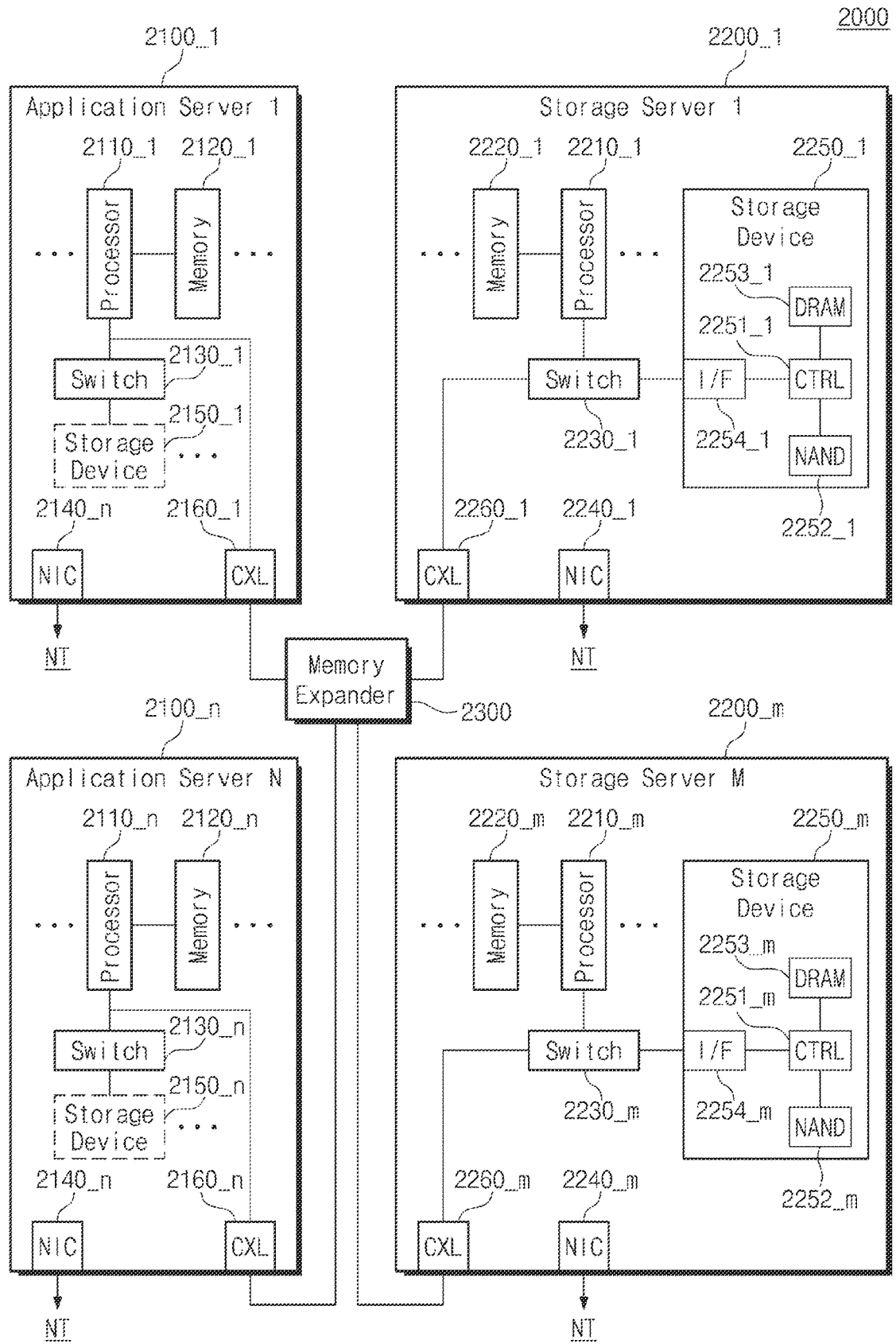
FIG. 24 is a block diagram illustrating a data center to which a server system according to an embodiment of the present disclosure is applied.

FIG. 24 is a block diagram illustrating a data center to which a server system according to an embodiment of the present disclosure is applied. Referring to FIG. 24, a data center 2000 that is a facility maintaining a variety of data and providing various services associated with data may be called a "data storage center". The data center 2000 may be a system for a search engine or database management or may be a computing system used in various institutions. The data center 2000 may include a plurality of application servers 2100_1 to 2100_n and a plurality of storage servers 2200_1 to 2200_m. The number of application servers 2100_1 to 2100_n and the number of storage servers 2200_1 to 2200_m may be variously changed or modified.

Below, for convenience of description, an example of the first storage server 2200_1 will be described. Each of the remaining storage servers 2200_2 to 2200_m and the plurality of application servers 2100_1 to 2100_n may have a structure similar to that of the first storage server 2200_1.

The first storage server 2200_1 may include a processor 2210_1, a memory 2220_1, a switch 2230_1, a network interface connector (NIC) 2240_1, a storage device 2250_1, and a compute express link (CXL) interface controller 2260_1. The processor 2210_1 may control overall operations of the first storage server 2200_1. The memory 2220_1 may store various instructions or data under control of the processor 2210_1. The processor 2210_1 may be configured to access the memory 2220_1 to execute various instructions or to process data. In an embodiment, the memory 2220_1 may include at least one of various kinds of memory devices such as a DDR SDRAM (Double Data Rate Synchronous DRAM), an HBM (High Bandwidth Memory), an HMC (Hybrid Memory Cube), a DIMM (Dual In-line Memory Module), an Optane DIMM, and an NVDIMM (Non-Volatile DIMM)

In an embodiment, the number of processors 2210_1 included in the first storage server 2200_1 and the number of memories 2220_1 included in the first storage server 2200_1 may be variously changed or modified. In an embodiment, the processor 2210_1 and the memory 2220_1 included in the first storage server 2200_1 may constitute a processor-memory pair and the number of processor-memory pairs included in the first storage server 2200_1 may be variously changed or modified. In an embodiment, the number of processors 2210_1 included in the first storage server 2200_1 and the number of memories 2220_1 included in the first storage server 2200_1 may be different. The processor 2210_1 may include a single core processor or a multi-core processor.

Under control of the processor 2210_1, the switch 2230_1 may selectively connect the processor 2210_1 and the storage device 2250_1 or may selectively connect the NIC 2240_1, the storage device 2250_1, and the CXL interface controller 2260_1.

The NIC 2240_1 may connect the first storage server 2200_1 with a network NT. The NIC 2240_1 may include a network interface card, a network adapter, and the like. The NIC 2240_1 may be connected with the network NT through a wired interface, a wireless interface, a Bluetooth interface, or an optical interface. The NIC 2240_1 may include an internal memory, a DSP, a host bus interface, and the like and may be connected with the processor 2210_1 or the switch 2230_1 through the host bus interface. The host bus interface may include at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, a USB (Universal Serial Bus) interface, an SD (Secure Digital) card interface, an MMC (Multi-Media Card) interface, an eMMC (embedded Multi-Media Card) interface, a UFS (Universal Flash Storage) interface, an eUFS (embedded Universal Flash Storage) interface, and a CF (Compact Flash) card interface. In an embodiment, the NIC 2240_1 may be integrated with at least one of the processor 2210_1, the switch 2230_1, and the storage device 2250_1.

Under control of the processor 2210_1, the storage device 2250_1 may store data or may output the stored data. The storage device 2250_1 may include a controller 2251_1, a nonvolatile memory 2252_1, a DRAM 2253_1, and an interface 2254_1. In an embodiment, the storage device 2250_1 may further include a secure element (SE) for security or privacy.

The controller 2251_1 may control overall operations of the storage device 2250_1. In an embodiment, the controller 2251_1 may include an SRAM. In response to signals received through the interface 2254_1, the controller 2251_1 may store data in the nonvolatile memory 2252_1 or may output data stored in the nonvolatile memory 2252_1. In an embodiment, the controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary for the controller 2251_1 to operate. The interface 2254_1 may provide a physical connection between the controller 2251_1 and the processor 2210_1, the switch 2230_1, or the NIC 2240_1. In an embodiment, the interface 2254_1 may be implemented to support a DAS (Direct-Attached Storage) manner that allows the direct connection of the storage device 2250_1 through a dedicated cable. In an embodiment, the interface 2254_1 may be implemented based on at least one of various above-described interfaces through a host interface bus.

The above components of the first storage server 2200_1 are provided as an example, and the present disclosure is not limited thereto. The above components of the first storage server 2200_1 may be applied to each of the remaining storage servers 2200_2 to 2200_m or each of the plurality of application servers 2100_1 to 2100_n. For example, each of the plurality of application servers 2100_1 to 2100_n may include processors 2110_1 to 2110_n, memories 2120_1 to 2120_n, switches 2130_1 to 2130_n, NICs 2140_1 to 2140_n, storage devices 2150_1 to 2150_n, and CXL interface controllers 2160_1 to 2160_n, respectively. Components of each of the plurality of application servers 2100_1 to 2100_n may correspond to components of each of the plurality of storage servers 2200_1 to 2200_n. In an embodiment, storage devices 2150_1 to 2150_n of the application servers 2100_1 to 2100_n may be selectively omitted.

The plurality of application servers 2100_1 to 2100_n and the plurality of storage servers 2200_1 to 2200_m may communicate with each other over the network NT. The network NT may be implemented by using a Fibre channel (FC), an Ethernet, or the like. In this case, the FC may be a medium that is used in high-speed data transmission and may use an optical switch providing high performance/high availability. Depending on an access manner of the network NT, the storage servers 2200_1 to 2200_m may be provided as file storage, block storage, or object storage.

In an embodiment, the network NT may be a storage dedicated network such as a storage area network (SAN). For example, the SAN may be an FC-SAN that uses an FC network and is implemented in compliance with an FC protocol (FCP). Alternatively, the SAN may be an IP-SAN that uses a TCP/IP network and is implemented in compliance with an iSCSI (or SCSI over TCP/IP or an Internet SCSI) protocol. In an embodiment, the network NT may be a general network such as a TCP/IP network. For example, the network NT may be implemented in compliance with a protocol such as FCoE (FC over Ethernet), NAS (Network Attached Storage), or NVMe-oF (NVMe over Fabrics).

In an embodiment, at least one of the plurality of application servers 2100_1 to 2100_n may be configured to access at least one of the remaining application servers or at least one of the plurality of storage servers 2200_1 to 2200_m over the network NT.

For example, the first application server 2100_1 may store data requested by a user or a client in at least one of the plurality of storage servers 2200_1 to 2200_m over the network NT. Alternatively, the first application server 2100_1 may obtain data requested by the user or the client from at least one of the plurality of storage servers 2200_1 to 2200_m over the network NT. In this case, the first application server 2100_1 may be implemented with a web server, a database management system (DBMS), or the like.

That is, a processor 2110_1 of the first application server 2100_1 may access a memory (e.g., 2120_n) or a storage device (e.g., 2150_n) of another application server (e.g., 2100_n) over the network NT. Alternatively, the processor 2110_1 of the first application server 2100_1 may access the memory 2220_1 or the storage device 2250_1 of the first storage server 2200_1 over the network NT. As such, the first application server 2100_1 may perform various operations on data stored in the remaining application servers 2100_2 to 2100_n or the plurality of storage servers 2200_1 to 2200_m. For example, the first application server 2100_1 may execute or issue an instruction for moving or copying data between the remaining application servers 2100_2 to 2100_n or between the plurality of storage servers 2200_1 to 2200_m. In this case, data targeted for movement or copy may be moved from the storage devices 2250_1 to 2250_m of the storage servers 2200_1 to 2200_m to the memories 2120_1 to 2120_n of the application servers 2100_1 to 2100_n through the memories 2220_1 to 2220_m of the storage servers 2200_1 to 2200_m or directly. Data transferred over the network NT may be data that are encrypted for security or privacy.

In an embodiment, the plurality of storage servers 2200_1 to 2200_m and the plurality of application servers 2100_1 to 2100_n may be connected with a memory expander 2300 through the CXL interface. The memory expander 2300 may be used as an expanded memory of each of the plurality of storage servers 2200_1 to 2200_m and the plurality of application servers 2100_1 to 2100_n. The plurality of storage servers 2200_1 to 2200_m and the plurality of application servers 2100_1 to 2100_n or virtualized components included therein may communicate with each other through the CXL interface and the memory expander 2300, based on the manner described with reference to FIGS. 1 to 21.

Figure 25:
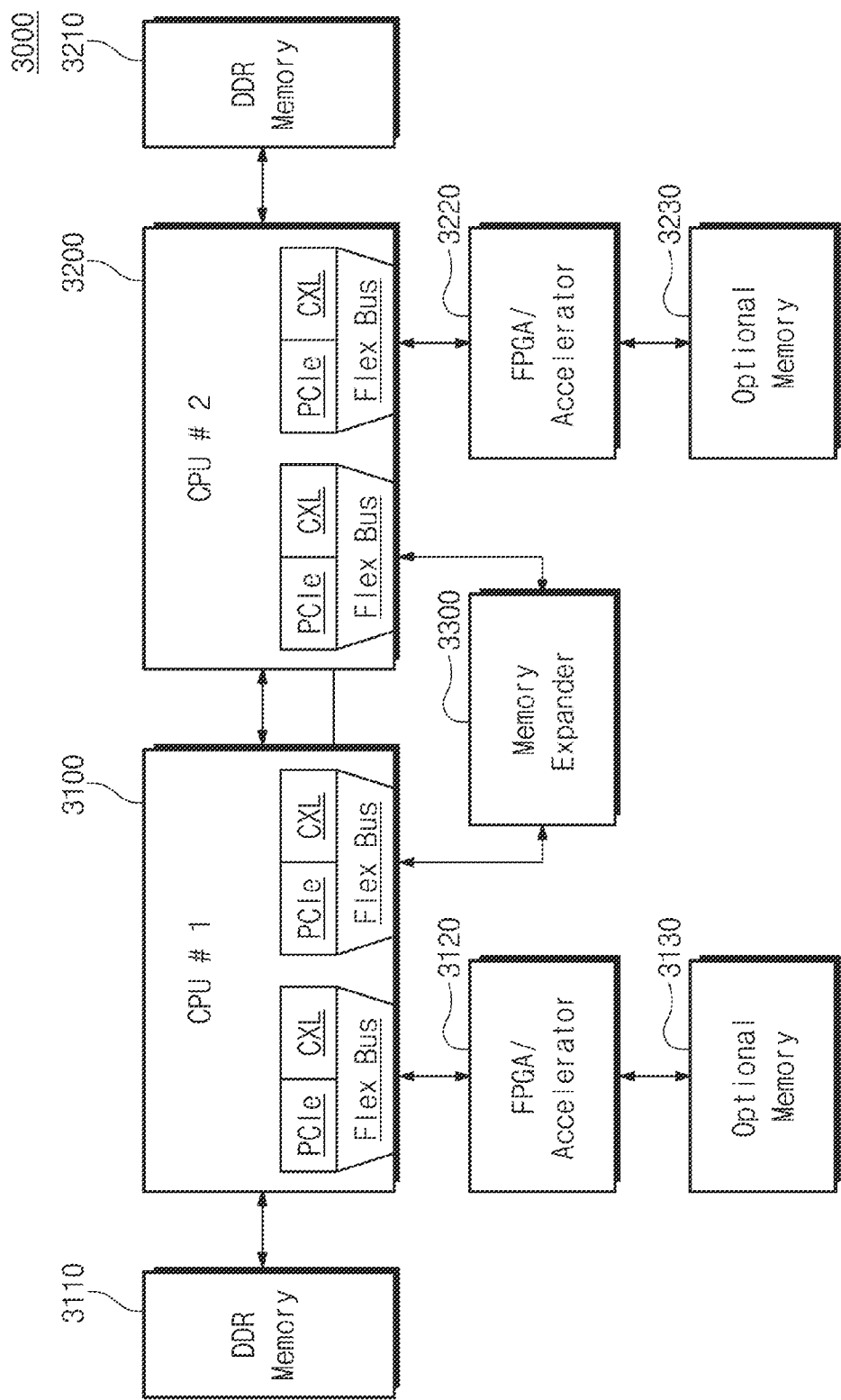
FIG. 25 is a diagram for describing an example (e.g., a CXL interface) of a heterogeneous computing interface applied to an embodiment of the present disclosure.

FIG. 25 is a diagram for describing an example (e.g., a CXL interface) of a heterogeneous computing interface applied to an embodiment of the present disclosure. In FIG. 25, a heterogeneous computing interface connected with a memory expander according to an embodiment of the present disclosure will be described with reference to the CXL interface, but the present disclosure is not limited thereto. For example, the heterogeneous computing interface may be implemented based on at least one of various computing interfaces such as a Gen-Z protocol, an NVLink protocol, a CCIX protocol, and an Open CAPI protocol.

Referring to FIG. 25, a heterogeneous computing system 3000 may include a plurality of CPUs 3100 and 3200, a plurality of memories 3110 and 3210, accelerators 3120 and 3220, optional memories 3130 and 3230, and a memory expander 3300. Each of the plurality of CPUs 3100 and 3200 may be a processor configured to process various operations/calculations/computations. The plurality of CPUs 3100 and 3200 may communicate with each other through a separate link. In an embodiment, the separate link may include a coherent link between CPUs.

The plurality of CPUs 3100 and 3200 may communicate with the plurality of memories 3110 and 3210, respectively. For example, the first CPU 3100 may directly communicate with the first memory 3110, and the second CPU 3200 may directly communicate with the second memory 3210. Each of the first and second memories 3110 and 3210 may include a DDR memory. In an embodiment, a virtual memory allocated to different virtual machines according to an embodiment of the present disclosure may be a memory allocated from the DDR memories 3110 and 3210.

The plurality of CPUs 3100 and 3200 may communicate with the accelerators 3120 and 3220 through a flex bus. The accelerators 3120 and 3220 may be calculators or processors that perform operations independently of the plurality of CPUs 3100 and 3200. The accelerator 3120 may operate under control of the corresponding CPU 3100, and the accelerator 3220 may operate under control of the corresponding CPU 3200. The accelerators 3120 and 3220 may be respectively connected with the optional memories 3130 and 3230. In an embodiment, the plurality of CPUs 3100 and 3200 may be configured to access the optional memories 3130 and 3230 through the flex bus and the accelerators 3120 and 3220.

The plurality of CPUs 3100 and 3200 may communicate with the memory expander 3300 through the flex bus. The plurality of CPUs 3100 and 3200 may use a memory space of the memory expander 3300.

In an embodiment, the flex bus may be a bus or a port configured to select a PCIe protocol or a CXL protocol. That is, the flex bus may be configured to select the PCIe protocol or the CXL protocol depending on a characteristic or a communication type of a device connected therewith. In an embodiment, the memory expander 3300 may operate like the memory expander described with reference to FIGS. 1 to 21 and may communicate with the plurality of CPUs 3100 and 3200 based on the CXL protocol.

In an embodiment, a flex bus-based communication structure is illustrated in FIG. 25 as being independent between components, but the present disclosure is not limited thereto. For example, the CXL communication between various components illustrated in FIG. 25 may be performed through the same bus or the same link.

According to the present disclosure, communications between virtual machines driven on different hosts may be performed through a heterogeneous computing interface (e.g., a CXL). In this case, because the communication between virtual machines is performed without passing through a network, the overhead occurring on the network may decrease, and thus, the communication between virtual machines may be accelerated. Accordingly, a memory expander with improved performance, a host device using the memory expander, and an operation method of a server system including the memory expander and the host device are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory expander comprising:
   a memory device including a first memory region corresponding to a first host and a second memory region corresponding to a second host; and
   a controller configured to communicate with the first host and the second host through a compute express link (CXL) interface, wherein the controller is configured to:
   receive a first CXL communication packet from the first host, wherein the first CXL communication packet includes a request for transferring target data from the first memory region to the second memory region; and
   perform a target data transfer operation of transferring the target data stored in the first memory region to the second memory region, in response to the first CXL communication packet.

2. The memory expander of claim 1, wherein:
   the first CXL communication packet includes a first CXL header, and
   the first CXL header includes:
   a memory operation code field indicating a type of the target data transfer operation;
   a first address field indicating a start address of a portion of the first memory region, in which the target data are stored;
   a second address field indicating an end address of the portion of the first memory region, in which the target data are stored;
   a third address field indicating a start address of a portion of the second memory region, in which the target data are to be stored;
   a fourth address field indicating an end address of the portion of the second memory region, in which the target data are to be stored; and
   a fifth address field indicating a type of the target data, a length of the target data, or a checksum associated with the target data.

3. The memory expander of claim 2, wherein:
   the type of the target data transfer operation includes at least one of a copy operation, a reference operation, and a share operation,
   during the copy operation, the target data are physically copied from the first memory region to the second memory region,
   during the reference operation, an address of the target data is referenced, without physically copying the target data from the first memory region to the second memory region, and
   during the share operation, the target data are physically copied from the first memory region to a shared memory region and an address of the target data copied to the shared memory region is referenced.

4. The memory expander of claim 3, wherein the first CXL header further includes a reserved field indicating a hold time of the target data when the memory operation code field indicates the reference operation or the share operation.

5. The memory expander of claim 4, wherein the controller is further configured to physically copy the target data from the first memory region to the second memory region after the hold time passes from a time at which the reference operation or the share operation associated with the target data is performed.

6. The memory expander of claim 3, wherein the controller is further configured to:
   receive a second CXL communication packet indicating an update of the target data from the first host;
   copy the target data from the first memory region to the second memory region in response to the second CXL communication packet; and
   update the target data of the first memory region after the target data are completely copied.

7. The memory expander of claim 1, wherein the controller is further configured to transmit a second CXL communication packet including the target data to the second host, after the target data transfer operation is completed.

8. The memory expander of claim 1, wherein:
   the first CXL communication packet includes a first payload, and
   the first payload includes an Internet protocol (IP) header and a transmission control protocol (TCP) header of a first communication packet generated by the first host.

9. The memory expander of claim 1, wherein the memory device further includes:
   a plurality of third memory regions respectively corresponding to a plurality of first virtual machines driven on the first host; and
   a plurality of fourth memory regions respectively corresponding to a plurality of second virtual machines driven on the second host.

10. The memory expander of claim 9, wherein the controller is further configured to:
    transmit, to the first host, a fourth CXL communication packet including data stored in a memory region corresponding to a third CXL communication packet received from the first host from among the plurality of third memory regions; and transmit, to the second host, a fifth CXL communication packet including data stored in a memory region corresponding to a fifth CXL communication packet received from the second host from among the plurality of fourth memory regions.

11. The memory expander of claim 1, wherein the memory expander is a Type 3 memory device defined by a CXL standard.

12. A host device comprising:
a first virtual machine configured to generate a first communication packet for providing target data to an external virtual machine;
a first switch configured to generate a second communication packet based on the first communication packet;
a first heterogeneous network interface controller configured to provide the second communication packet to an external memory expander through a heterogeneous network interface; and
a network interface controller configured to communicate with an external host device over a network, wherein the external virtual machine is driven on the external host device connected with the external memory expander through the heterogeneous network interface.

13. The host device of claim 12, wherein:
the first communication packet is a communication packet based on a transmission control protocol/Internet protocol (TCP/IP), and
the second communication packet is a communication packet based on a compute express link (CXL) protocol.

14. The host device of claim 12, wherein:
the first communication packet includes an Ethernet header, an Internet protocol (IP) header, a transmission control protocol (TCP) header, and a first payload including the target data,
the second communication packet includes a CXL header and a second payload, and
the second payload includes the IP header, the TCP header, and the first payload.

15. The host device of claim 14, wherein the CXL header includes:
a memory operation code field indicating a type of a target data transfer operation;
a first address field indicating a start address of a region of the external memory expander, in which the target data are stored;
a second address field indicating an end address of the region of the external memory expander, in which the target data are stored;
a third address field indicating a start address of a region of the external memory expander, in which the target data are to be stored;
a fourth address field indicating an end address of the region of the external memory expander, in which the target data are to be stored; and
a fifth address field indicating a type of the target data, a length of the target data, or a checksum associated with the target data.

16. The host device of claim 12, further comprising:
a central processing unit (CPU) configured to drive the first virtual machine; and
an internal memory configured to allocate a first virtual memory to the first virtual machine.

17. The host device of claim 16, wherein a host operating system driven by the central processing unit is configured to communicate with the external host device through the network interface controller and the network.

18. An operation method of a server system which includes a memory expander, a first host connected with the memory expander, and a second host connected with the memory expander, the method comprising:
generating, by the first host, a first communication packet;
generating, by the first host, a second communication packet based on the first communication packet;
receiving, by the memory expander, the second communication packet through a heterogeneous computing interface;
transferring, by the memory expander, target data from a first memory region corresponding to the first host to a second memory region corresponding to the second host in response to the second communication packet;
generating, by the memory expander, a third communication packet;
receiving, by the second host, the third communication packet through the heterogeneous computing interface; and
generating, by the second host, a fourth communication packet based on the third communication packet, wherein
the first communication packet and the fourth communication packet are transmission control protocol/Internet protocol (TCP/IP)-based communication packets, and
the second communication packet and the third communication packet are compute express link (CXL) protocol-based communication packets.

19. The method of claim 18, wherein the first communication packet is generated by a first virtual machine driven on the first host, and the fourth communication packet is transmitted to a second virtual machine driven on the second host.

20. The method of claim 19, wherein a first host operating system driven on the first host communicates with the second host over a network.

* * * * *